(12) United States Patent
Altheimer et al.

(10) Patent No.: US 8,789,946 B2
(45) Date of Patent: Jul. 29, 2014

(54) REFERENCE POINTS FOR ORTHO POSITION

(75) Inventors: Helmut Altheimer, Baisweil-Lauchdorf (DE); Gregor Esser, Munich (DE); Wolfgang Becken, Munich (DE)

(73) Assignee: Rodenstock GmbH, Munich (DE)

( * ) Notice: Subject to any disclaimer, the term of this patent is extended or adjusted under 35 U.S.C. 154(b) by 1364 days.

(21) Appl. No.: 12/524,325

(22) PCT Filed: Jan. 25, 2008

(86) PCT No.: PCT/EP2008/000586
§ 371 (c)(1),
(2), (4) Date: Jan. 28, 2010

(87) PCT Pub. No.: WO2008/089997
PCT Pub. Date: Jul. 31, 2008

(65) Prior Publication Data
US 2010/0141893 A1 Jun. 10, 2010

(30) Foreign Application Priority Data
Jan. 25, 2007 (DE) .................. 10 2007 003 818

(51) Int. Cl.
*G02C 7/02* (2006.01)

(52) U.S. Cl.
CPC ...................... *G02C 7/02* (2013.01)
USPC ............. 351/159.74; 351/159.58; 351/159.45

(58) Field of Classification Search
USPC .............. 351/159.58, 159.45, 159.73–159.78
See application file for complete search history.

(56) References Cited

U.S. PATENT DOCUMENTS

| 6,382,790 | B1 * | 5/2002 | Girod ........................ 351/159.74 |
| 6,789,898 | B2 * | 9/2004 | Le Saux et al. .......... 351/159.01 |
| 2003/0231282 | A1 | 12/2003 | Saux et al. |
| 2004/0032565 | A1 * | 2/2004 | Yamakaji et al. ............. 351/177 |
| 2004/0233385 | A1 | 11/2004 | Kitani et al. |

FOREIGN PATENT DOCUMENTS

| DE | 101 51 135 A1 | 4/2002 |
| EP | 1 154 302 A1 | 11/2001 |
| EP | 1 666 953 A1 | 6/2006 |
| JP | H11295672 A | 10/1999 |
| JP | 2006-053227 A | 2/2006 |
| WO | WO 02/088832 A2 | 11/2002 |

OTHER PUBLICATIONS

International Search Report dated May 28, 2008 (Three (3) pages).
Esser G., et al., "Die Performance Individueller Gleitsichtglaeser", Doz Optometrie, Dec. 1, 2005, pp. 38-44, XP-000962762.

(Continued)

*Primary Examiner* — Scott J Sugarman
*Assistant Examiner* — Robert E Tallman
(74) *Attorney, Agent, or Firm* — Crowell & Moring LLP

(57) ABSTRACT

The invention relates to a method, a system and a computer program product, in particular for designing or producing a lens having a prismatic effect, and to a lens having a prismatic effect. Said method consists of the following steps: individual data of the spectacle wearer is obtained, said individual user data comprising prismatic prescription data; the prismatic lens is designed taking into account the individual user data; centration data for the prismatic lens is determined in accordance with the prismatic prescription data.

20 Claims, 18 Drawing Sheets

(56) References Cited

OTHER PUBLICATIONS

Figure 1:
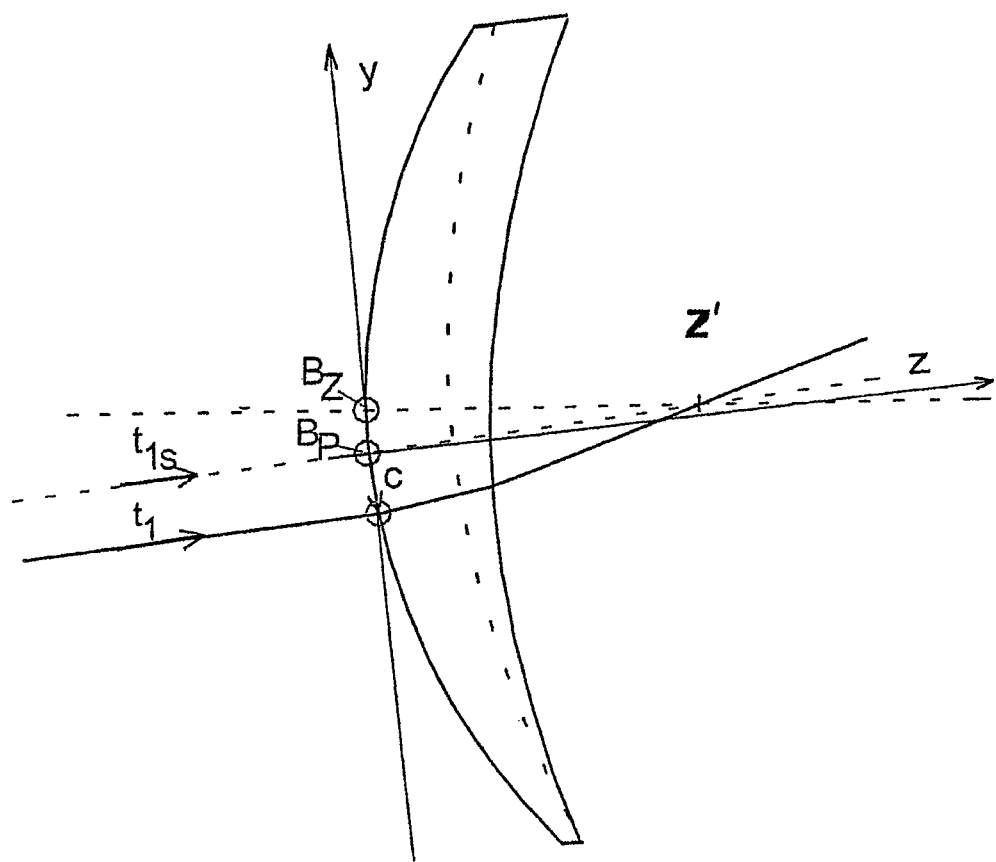

EPO Office Action dated Nov. 5, 2010 with English machine translation (Seven (7) pages).
Wolfgang Schulz and Johannes Eber: "Brillenanpassung—Ein Schulbuch and Leitfaden", Optische Fachveröffentlichung GmbH, Heidelberg, DE, 1997, pp. 35-40, ISBN: 3-922269-21-4 (cited in B1) with English machine translation (Thirteen (13) pages).
Japanese Office Action dated May 7, 2013 with translation (Nine (9) pages).

* cited by examiner

FIG 13

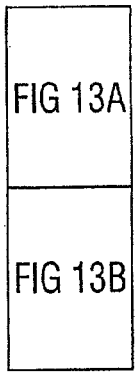

FIG 13A

Rodenstock spectacle lenses     ○ Order     ○ Request   ○ Repetition

Order basic data

Customer no.: _____    Comission: _____    Company

Date: _____    Delivery: _____

Lens type / EDP code: _____ R⌀___/___○ centr.

Color / Coating: _____ L⌀___/___○ centr.

| | Sph. | Cyl. | Axis | Add | Prism 1 | Base 1 | Prism 2 | Base 2 |
|---|---|---|---|---|---|---|---|---|
| R | | | | | | | | |
| L | | | | | | | | |

Adjustment of prismatic vertical differences in case of anisometropy ○ yes ○ no

Allocate prisms?
R/L
○ yes
○ no

Frame and centration data

| Frame [Box dimension in mm] | | | Centration fitting data in mm | | | Centration correction taken into account ○ yes ○ no |
|---|---|---|---|---|---|---|
| HLS | VLS | AzG | Horizontal | $P_R$ | $P_L$ | |
| | | | Vertical | $Y_R$ | $Y_L$ | |

R            L

Draw in drill holes and nicks

| ○ MDM ○ Optimized diameter | Min. edge thickness of the edged lens [mm] | Thickness at marked point [mm] |
|---|---|---|

FIG 13B

| | | R | L |
|---|---|---|---|
| Optimization parameters | Pupillary distance (PD) [mm] | R | L |
| | CVD of the correction spectacles [mm] | R | L |
| | CVD of the measurement spectacles [mm] | R | L |
| | Frame forward inclination [°] | R | L |
| | Face form angle [°] | R | L |
| | Inset [°] | R | L |

○ Standard Design    ○ Frame - optimized design    ○ Individual design
   ○ DN=-18 mm      please indicate frame and    Design point distance: (DD):___
   ○ DN=-16 mm      centration data            Design point near: (DN):___
   ○ DN=-14 mm
○ Individual near distance
   Refraction distance NEAR ____ cm      ○ Base curve____ D
   Principal viewing distance NEAR ____ cm

| | | | | | | | | | | | |
|---|---|---|---|---|---|---|---|---|---|---|---|
| Prisms | For prisms in position of wear | | | | | | | | | | |
| | Arrangement of the refraction lenses in the measurement spectacles (perpendicular in front of the eye) | | | | | | | | | | |
| | | Sph. | Cyl. | Prism | Base | Slant | Eye | Sph. | Cyl. | Prism | Base | Slant |
| | 5 | | | | | | | | | | | |
| | 4 | | | R | | | Frame | | | L | | |
| | 1 | | | | | | Plane | | | | | |
| | 2 | | | | | | | | | | | |
| | 3 | | | | | | Object | | | | | |
| | Centration of the refraction lenses in the measurement spectacles | | | | | | | | | | |
| | ○ PMZ | ○ Formula centration | | ○ Special case | | Horizontal [mm] | | R | | L | | |
| | | | | | | Vertical [mm] | | R | | L | | |
| | Position of the facette | | | | | | | | | | |
| | Expected facette course of the edged lens | | | | | R ○ Object-side   ○ 1/2 Eye-side   ○ 1/3 Eye-side | | | | | | |
| | | | | | | L ○ Object-side   ○ 1/2 Eye-side   ○ 1/3 Eye-side | | | | | | |

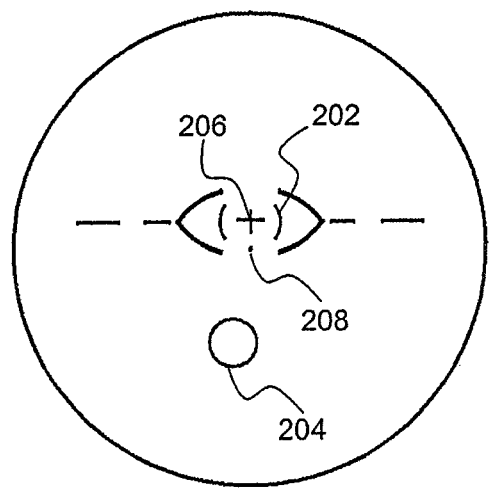 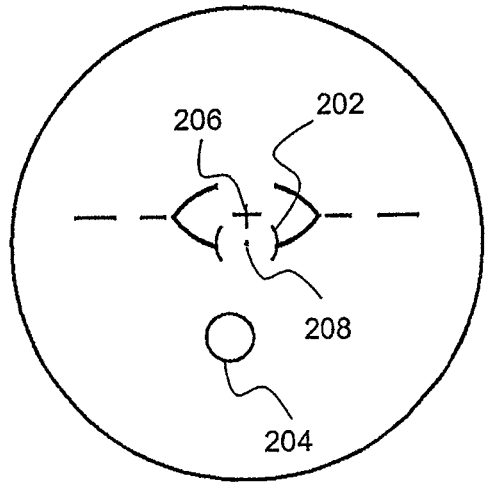
Fig. 16a                    Fig. 16b
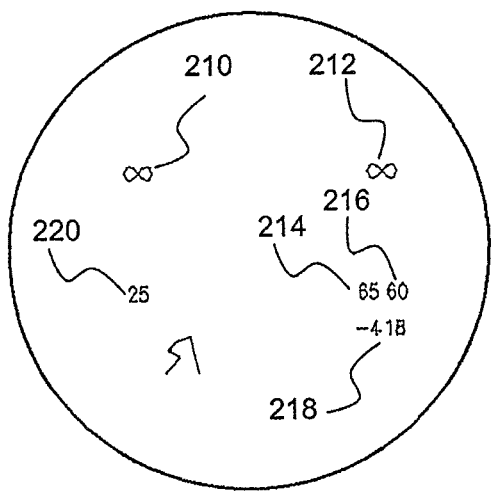
Fig. 17

FIG 18
Impression FreeSign Perfalit 1.6
 Solitaire ⌀56/62
gradually gray 10/75%   MDM 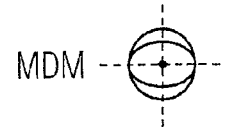
| | ⊕ | ⌷ | ⌒ | ◿ | ⊙ | ✚ |
|---|---|---|---|---|---|---|
| 📝 | 2,00 | 1,00 | 35 | 4,00 | 45 | 2,00 |
| ≡◧ | 1,65 | 1,25 | 38 | 3,70 | 36 | 1,78 |
      COR  31,7
 32,0    9,0°   DF 1,2   INS 0,5   BC 6,5
 13,0    15,0°   DN -15,6    0,0 |  0,0 PMZ

FIG 19

| | prescription values | | |
|---|---|---|---|
| 👓 | right | ◿ | prism |
| 👓 | left | ⊕ | base |
| ⊕ | sphere | ✚ | sphere |
| ⌭ | cylinder | 📄 | prescription value |
| ⌒ | axis | ⊸ | target value |
| ⌀ | diameter | ◉ | center thickness minimization |
| | individual parameters 👀 | | design parameters ☉ |
| ⊩ | corneal vertex distance | DF | design point distance |
| 👓 | face form angle | DN | design point near |
| ⟟ | forward inclination | BC | base curve |
| 👁 | pupillary distance right | INS | inset |
| 👁 | pupillary distance left | | |
| | centration | | |
| COR 👁 | corrected fitting PD right | COR 👁 | corrected fitting PD left |
| 👁→ | centration correction right nasal | ←👁 | centration correction left nasal |
| 👁← | centration correction right temporal | 👁→ | centration correction left temporal |
| ↓👁 | centration correction right bottom | ↓👁 | centration correction left bottom |
| ↑👁 | centration correction right top | ↑👁 | centration correction left top |
| PMZ | pupil center centration | FF | formula centration |
| | additional information | | |
| CVD Refraktion | Corneal vertex distance refraction | HDEC | horizontal predecentration |
| Prism Adaption | prism adaption | MVDN | main visual distance near |
| RDN | refraction distance near | | |

REFERENCE POINTS FOR ORTHO POSITION

The present invention relates to a method, a system and a computer program product, in particular for designing or producing a spectacle lens having prismatic power, and to a spectacle lens having prismatic power for an improved centration.

Spectacle lens having prismatic power (in the following also referred to as prismatic spectacle lenses) are used for correcting heterophorias. If a prismatic power or a spectacle lens having prismatic power p is in front of an eye of a spectacle wearer, as is shown in the schematic representation in FIG. 3, an object point can only be fixed by a compensatory focusing movement of the eye and thus be imaged centrally on the fovea. This leads to a displacement c of the visual point on the spectacle lens opposite to the base position of the prism. In the illustrated case of FIG. 3, when determining the prismatic deviation, the prismatic side effect of the correction lens is to be taken into account in addition to the prism.

Figure 4:
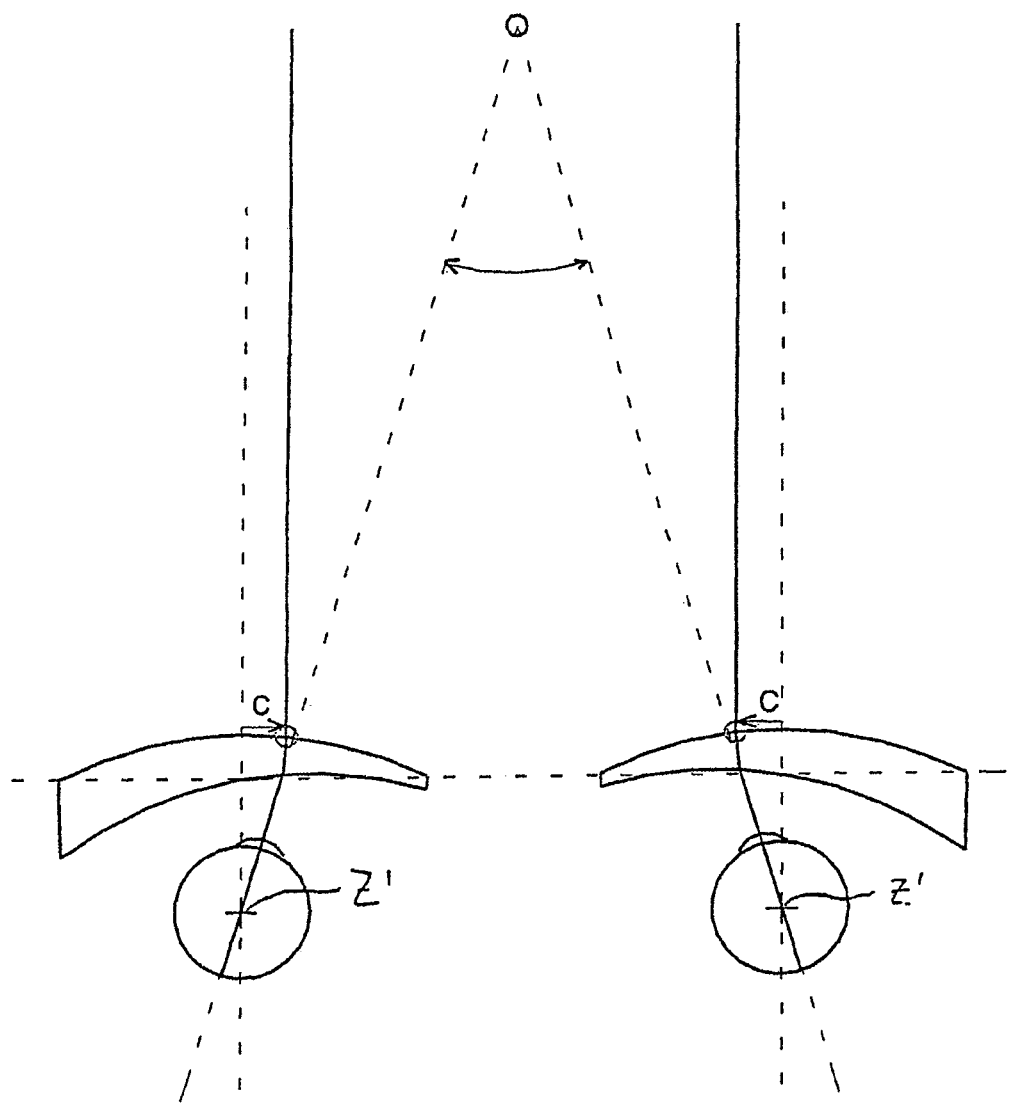

In the correction of heterophorias by prismatic spectacle lenses, the same phenomenon and thus the actual problem arises in the centration of the lenses in front of the eye and/or the fitting of the prismatic spectacle lenses into the frame. As shown in FIG. 4, the pair of eyes performs adjustment movements behind the lenses so that the visual axes are allowed to intersect in the object point and the point can be seen easily binocularly. The prism reference point, the point on the spectacle lens, in which the required prismatic power exists, must not lie in front of the ocular center of rotation, but must be shifted opposite to the base position until it coincides with the fixing main ray on the lens front surface. Only then do the imaging ray path and the calculating ray path match and does the prism reference point coincide with the corresponding visual point.

In particular, when centering the lenses, the optician also has to consider a decentration c, in addition to the calculation of the centration data $u_1$ and $v_1$, due to the prismatic power and can only then calculate the overall decentration u and v of the reference point toward the former center or box center:

$$u = u_1 + c_{pr} \cos \beta$$

$$v = v_1 - c_{pr} \sin \beta$$

where $\beta$ designates the base position.

However, this procedure is prone to errors, cost and time-intensive and imprecise. It is exactly the exact centration of progressive lenses in front of the eyes that is extremely important for an undisturbed binocular vision. In particular in the case of progressive lenses, it has to be made sure in the horizontal that the main line of sight passes exactly through the center of the progression channel when the eyes are lowered, and it has to be made sure in the vertical direction that no additional prismatic height differences occur. However thoroughly the optician works, he/she can only consider the necessary decentration approximately.

It is the object of the invention to provide a method, a system and a computer program product, which allows for a simpler and more precise centration of spectacle lenses, in particular of spectacle lenses with prismatic power, as well as a spectacle lens having prismatic power for an improved centration. This object is solved by a method including the features of claim 1 or 14, a computer program product including the features of claim 22, a system including the features of claim 23, and a spectacle lens including the features of claim 24. Preferred embodiments are subject of the dependent claims.

Thus, in one aspect, the invention provides a method for producing a spectacle lens with prismatic power or a prismatic spectacle lens for a spectacle wearer, said method comprising:

- obtaining individual user data or application data of the spectacle wearer, wherein the individual user data comprises prismatic prescription data;
- designing the spectacle lens with prismatic power taking into account the individual user data; and
- determining and specifying centration data particularly of the position of a fitting point for the spectacle lens with prismatic power or prismatic spectacle lens in dependence on the prismatic prescription data.

Thus, the optician may perform a centration of a prismatic spectacle lens or spectacle lens with prismatic power for an individual spectacle wearer in a particularly simple and precise manner. In particular, the optician may perform a simple centration on the basis of centration data determined depending on the individual prismatic prescription data without having to conduct an additional decentration taking into account the prismatic power. This leads particularly to an improvement of the centration precision.

A prismatic spectacle lens or spectacle lens with prismatic power is particularly understood to be a spectacle lens fabricated such that it has a prismatic power different from zero in a reference point, in particular in a prism reference point specified by the manufacturer, which preferably coincides with the geometric center of the raw optical glass. The prismatic power preferably relates to a basic deflection, i.e. to the deflection of a light ray in the case that the light ray is perpendicular to one of the two surfaces of the spectacle lens, in particular in the prism reference point. The prism reference point is preferably indicated as a dot on the front surface of the spectacle lens. Thus, a prismatic power for the prismatic spectacle lens is particularly to be understood to be a power introduced for the correction according to the prismatic prescription data and/or introduced by a thickness reduction prism, which power is in particular present across the entire spectacle lens or at least across an entire zone of the spectacle lens adapted for a specific viewing zone or a specific visual task, but not a prismatic side effect exclusively introduced by the non-prismatic prescription data, such as sphere, cylinder, etc.

As centration data, there may be determined in particular position data of a fitting point on and/or in a spectacle lens and/or with respect to a spectacle lens, wherein the fitting point is particularly that point on or in the spectacle lens or with respect to the spectacle lens which in or for a correct centration of the spectacle lens for the spectacle wearer is located horizontally in front of the pupil of the spectacle wearer in the position of wear of the spectacle lens in particular according to the individual user data and in the zero direction of sight of the spectacle wearer, or is to be located for a correct centration. The position data of the fitting point may in particular be determined as spatial position or positions relative to one or more reference points specified for the spectacle lens. In a preferred embodiment, such specified reference points comprise permanent and/or non-permanent markings on and/or in the spectacle lens. Preferably, such markings comprise engravings and/or stampings or stamp images.

In a preferred embodiment, the centration data comprises position data in the form of length and/or distance and/or angle and/or proportional information of a position of the fitting point relative to marked reference points. Angle information may particularly relate to an angle of a position vector or location vector of the fitting point relative to a lens horizontal and/or a lens vertical, which in turn are specified preferably by permanent or non-permanent markings on or in the spectacle lens.

In a further preferred embodiment, the centration data comprises one or more markings on and/or in the spectacle lens, which directly indicate a centration position, in particular the fitting point. Thus, preferably the fitting point itself is formed or located as a permanent or non-permanent marking at and/or in and/or on the spectacle lens, wherein this marking forms at least a part of the centration data. The method preferably further comprises applying a particularly permanent and/or non-permanent centration marking on and/or in the spectacle lens in particular on at least one surface of the spectacle lens in particular at the fitting point depending on the determined centration data or as at least a part of the centration data in particular depending on the prismatic prescription data. Particularly preferably, applying the centration marking comprises stamping a centration cross and/or another suitable centration marking on the at least one surface of the spectacle lens, with the help of which an optician can, for correct centration, perform an adjustment of the fitting point of the prismatic spectacle lens to a centration point individually determined for the spectacle wearer. To this end, the centration data is individually determined by the spectacle lens manufacturer preferably during the production of the spectacle lens, and are provided to the optician.

Preferably, the individual user data comprises individual optical correction powers, or effects, or correction data for correction of a visual defect of the spectacle wearer and data of wear relating to an individual positioning of the spectacle lens for the spectacle wearer and/or relating to an individual visual task of the spectacle wearer. When designing the spectacle lens with prismatic power or the prismatic spectacle lens, the correction powers and/or the data of wear are preferably taken into account.

Thus, the individual user data for example as part of the individual correction data comprise dioptric power data, such as sphere, cylinder, axis (axis position of the cylinder), prism, base and/or addition. Lenses with prismatic power or prismatic spectacle lenses in particular serve for correction of position anomalies of the eyes. To this end, the user data in particular comprises prismatic prescription data and/or correction data and/or a prescription prism, i.e. prescription values in particular for correction of such errors of position. In particular, the prismatic prescription data comprises an amount (absolute value) and a base position of the required prismatic correction power of the desired spectacle lens. Preferably, the individual user data comprises individual correction data for a plurality of directions of sight of the spectacle wearer.

In a preferred embodiment, the data of wear at least partly specifies at least one preferably individual position of wear. To this extent, the individual user data preferably comprise a corneal vertex distance and/or an ocular center of rotation distance and/or a pupillary distance and/or a face form angle and/or a forward inclination or forward inclination of the frame or a pantoscopic angle. In a preferred embodiment, die individual user data comprises frame data, such as a vertical lens size and/or a horizontal lens size and/or a face form angle and/or a frame bending or glass contraction of the frame and/or a bridge width or a distance between lenses (AzG) and/or a bridge height and/or a smallest or minimal raw optical glass diameter suitable for the frame and/or lens or boxed center distance and/or a lens shape. In a preferred embodiment, the data of wear at least partly specify a preferably individual situation of wear or application situation. To this end, the individual user data, in particular the individual data of wear, comprises preferred and mainly used viewing zones or zones of preferred and mainly used viewing angles of the spectacle wearer and/or an object distance and/or a plurality of object distances for a plurality of viewing angles and/or directions of sight.

In a preferred embodiment, determining centration data for the prismatic spectacle lens comprises:
  determining draft centration data and auxiliary centration data in particular of an auxiliary centration point or auxiliary fitting point independent of the prismatic prescription data and with the prismatic prescription data being neglected; and
  determining centration shifting data relative to the draft centration data and auxiliary centration data depending on and taking into account the prismatic prescription values.

Preferably, determining auxiliary centration data comprises applying in particular a permanent and/or a non-permanent auxiliary centration marking at and/or in the spectacle lens in particular on at least one surface of the spectacle lens depending on the determined auxiliary centration data or as at least a part of the auxiliary centration data. Particularly preferably, applying the auxiliary centration marking comprises stamping of a centration cross and/or another suitable auxiliary centration marking on the at least one surface of the spectacle lens, which particularly serves as the starting or reference point for the determination of the fitting point on the basis of the centration shifting data. In a preferred embodiment, the centration shifting data is individually determined by the spectacle lens manufacturer preferably during production of the spectacle lens and are provided to the optician.

Preferably, designing the spectacle lens with prismatic power or the prismatic spectacle lens comprises:
  determining a in particular non-prismatic draft design, i.e. in particular a draft design for a spectacle lens without prismatic power considering and dependent on the individual user data without the prismatic prescription data and neglecting the prismatic prescription data; and
  adding a prismatic power to the draft design depending on the prismatic prescription data.

Preferably, adding the prismatic power takes place independent of further individual optical correction powers, or effects, in particular independent of the remaining user data. Preferably, adding the prismatic power takes place by tilting a rear surface and/or a front surface in the draft design of the spectacle lens relative to each other. Depending on the selected coordinate system, at least one of the two surfaces is tilted in this coordinate system.

In a preferred embodiment, determining a particularly non-prismatic draft design comprises determining and specifying draft centration data or auxiliary centration data, in particular a draft centration point or auxiliary centration point. Preferably, the draft centration data, in particular the draft centration point or auxiliary centration point, is determined such that upon the centration for the spectacle wearer according to the draft centration data, a particularly non-prismatic draft spectacle lens fabricated according to the draft design fulfills or would fulfill the individual correction powers for the spectacle wearer, which are comprised by the user data, in particular the draft centration point and in particular in a positioning of the draft spectacle lens according to the data of wear. Preferably, this draft spectacle lens is not fabricated. Instead, this draft design serves as a preferred auxiliary design or design intermediate product for designing the final spectacle lens. In a preferred embodiment, such a draft design comprises an intermediate result or data intermediate product of a computer-aided optimization method.

Preferably, determining the fitting point comprises determining a fitting shift or centration shift $s_Z$ as a shift of the fitting point relative to the auxiliary centration point.

In a preferred embodiment, determining the centration data comprises determining a decentration $c_Z$ as a shift of the centration point individually determined for the spectacle wearer. Preferably, the decentration corresponds to the negative centration shift, i.e. $c_Z=-s_Z$. Preferably, the centration shift $s_Z$ designates a shift of the fitting point relative to the auxiliary centration point in the direction of the base of the prism of the prismatic spectacle lens. The decentration $c_Z$ preferably designates a shift of the centration point in a direction opposite to the base or away from the base.

Preferably, the centration shift $s_Z$ and/or the decentration $c_Z$ is/are determined depending on the prismatic prescription data and further individual user data. In particular, the individual user data preferably comprises a corneal vertex distance e and/or an ocular center of rotation distance b' and/or an edge thickness $d_R$ of the spectacle lens and/or a center thickness and/or a minimum thickness $d_{min}$ of the spectacle lens and/or a lens forward inclination or frame forward inclination or a pantoscopic angle and/or a face form angle and/or a spectacle lens diameter or spectacle lens shape, or lens shape, diameter and/or at least a refractive power and/or a refractive index of the spectacle lens and/or a base curve and/or an astigmatic power and/or an addition, wherein the centration data and in particular the centration shift $s_Z$ and/or the decentration $c_Z$ is determined depending on the corneal vertex distance e and/or an ocular center of rotation distance b' and/or an edge thickness $d_R$ of the spectacle lens and/or the center thickness and/or a minimum thickness $d_{min}$ of the spectacle lens and/or a lens forward inclination or frame forward inclination or the pantoscopic angle and/or the face form angle and/or the spectacle lens diameter or spectacle lens shape, or lens shape, diameter and/or the at least one refractive power and/or the refractive index of the spectacle lens and/or the base curve and/or the astigmatic power and/or the addition.

In a preferred embodiment, the centration shift $s_Z$ in the unit mm is determined depending on the corneal vertex distance e in the unit mm and the prismatic power p in the unit cm/m according to $$s_Z = \frac{(e+15)p}{10}$$

in the direction toward the base of the prism.

In one aspect, the invention provides a method for producing a spectacle lens with prismatic power or a prismatic spectacle lens for a spectacle wearer, said method comprising:
  obtaining individual user data of the spectacle wearer, wherein the individual user data comprises prismatic prescription data;
  determining a draft design taking into account the individual user data without the prismatic prescription data;
  determining a fitting point and at least one optical draft reference point for at least one optical power parameter of the spectacle lens depending on the individual user data without the prismatic prescription data such that upon the centration for the spectacle wearer according to the fitting point, a draft spectacle lens fabricated according to the draft design fulfills a predetermined value for the at least one optical power for the spectacle wearer for at least one main ray passing through the optical draft reference;
  adding a prismatic power to the draft design depending on the prismatic prescription data; and
  determining a reference point shift $c_B$ depending on the prismatic prescription data.

Preferably, the at least one optical power parameter is included in the individual user data and individually specified in the individual user data in particular for the spectacle lens, wherein the predetermined value thereof is the value for this power parameter comprised by the user data if the at least one optical power does not comprise the prismatic prescription data, and is specified as zero if the optical power parameter relates to the prismatic power or prescription prism.

In a preferred embodiment, the at least one optical draft reference point comprises a prism reference point, wherein the predetermined value for the at least one optical power parameter comprises a value zero for the prismatic power. In a further preferred embodiment, the at least one optical draft reference point comprises a distance reference point, wherein the predetermined value for the at least one optical power parameter comprises a value for the dioptric distance power comprised by the individual user data. In a further preferred embodiment, the at least one optical draft reference point comprises a near reference point, wherein the predetermined value for the at least one optical power parameter comprises a value for the dioptric near power comprised by the individual user data.

In a preferred embodiment, the prismatic prescription data comprises a vertical component $p_y$ of a prismatic correction power, wherein the vertical component $c_y$ (in mm) of the decentration $c_Z$ and/or of the reference point shift $c_B$ is determined according to the formulas $$\delta = -\frac{p_y}{100} (p_y \text{ in cm/m})$$

$$\alpha_K = \frac{\delta}{n-1}$$

$$d_{Pr} = \frac{\emptyset |\tan\alpha_K|}{2} \approx \frac{\emptyset |\alpha_K|}{2},$$

with a spectacle lens diameter $\emptyset$ (in mm), $$z_K = b' + \frac{e+10}{100}(b' + d_{Pr} + d_{min} + \max(0, S'))\cos\alpha_v$$

with an ocular center of rotation distance b' (in mm), a corneal vertex distance e (in mm), a minimum thickness $d_{min}$ of the spectacle lens (in mm), a mean refractive power S' of the spectacle lens (in D), $\Delta y_1 = y_{BP} - y_{BZ}$, with a vertical position component $y_{BP}$ of the optical draft reference point (in mm) and a vertical position component $y_{BZ}$ of the fitting point, $$\varphi_1 = \arctan\left(\frac{\Delta y_1}{z_K}\right)$$

$$\varphi_2 = \varphi_1 + \delta$$

$$\Delta y_2 = z_K \tan\varphi_2$$

$$c_y = \Delta y_2 - \Delta y_1$$

In a further preferred embodiment, a determination of the centration shift $s_z$ takes places analogously, optionally with an opposite algebraic sign, as already mentioned.

Preferably, the method comprises
- determining at least one object-side "target" direction as the direction of the object-side portion of the main ray through the at least one optical draft reference point of the draft spectacle lens; and
- specifying a prismatic draft design by adding a prismatic power to the draft design depending on the prismatic prescription data, wherein determining the reference point shift comprises
- specifying at least one shifted draft reference point shifted by a starting value of the at least one reference point shift relative to the at least one draft reference point;
- determining at least one object-side "actual" direction as the direction of the object-side portion of the main ray through the at least one shifted draft reference point on the basis of the prismatic draft design;

and wherein the method further comprises
- evaluating the prismatic draft design on the basis of the at least one "target" direction and the at least one "actual" direction.

Preferably, in the case of insufficient conformity of the at least one "actual" direction and the at least one "target" direction, a further reference point shift is determined in the step of evaluating the prismatic draft design. In the case of sufficient conformity of the at least one "actual" direction and the at least one "target" direction, the prismatic draft design is preferably specified as the spectacle lens design. Subsequently, on the basis of the thus specified spectacle lens design, the spectacle lens could be fabricated and in particular be provided with a centration marking, such as a centration cross at the fitting point.

Preferably, the spectacle lens comprises a reference surface on or with respect to which the fitting point and/or the at least one optical reference point or draft reference point is specified and/or shifted, and a prescription surface determined and adjusted depending on the individual optical correction data. In a preferred embodiment, the prismatic spectacle lens is an individual multifocal spectacle lens, in particular an individual progressive spectacle lens, wherein the reference surface comprises the progressive surface at least partially. Preferably, the reference surface designates a surface of the spectacle lens which comprises a plurality of preferred reference points, in particular a prism reference point and/or a distance reference point and/or a near reference point, or a surface to which such reference points are assigned or may be assigned according to the optical power of the surface. In particular for a progressive spectacle lens with at least one progressive surface does the reference surface at least partially comprise the progressive surface. In a preferred embodiment, the reference surface at least partially forms the front surface of the spectacle lens, while the prescription surface at least partially forms the rear surface of the spectacle lens. In another preferred embodiment, the reference surface forms the rear surface of the spectacle lens, while the prescription surface forms the front surface. In a further preferred embodiment, the reference surface and the prescription surface at least partially coincide and thereby form at least partially either the front surface of the rear surface of the spectacle lens. Here, it is not necessary that the reference points are located on the prescription surface. In particular in a progressive spectacle lens, the reference surface could comprises part of the rear surface, wherein the reference points, in particular the prism reference point and/or a distance reference point and/or a near reference point, are located and defined on the front surface.

Preferably, the method comprises a step of specifying a corrected prismatic draft design, which preferably comprises:
- shifting the prescription surface relative to the reference surface and/or the reference surface relative to the fitting point depending on the at least one reference point shift; and
- determining a corrected prismatic draft design by optimizing the prescription surface depending on the user data,
- wherein determining the at least one object-side "actual" direction as the direction of the object-side portion of the main ray through the at least one shifted draft reference point takes place on the basis of the corrected prismatic draft design.

Preferably, the step of specifying a corrected prismatic draft design comprises:
- shifting a plurality of reference points or draft reference points relative to the fitting point depending on the at least one reference point shift and in correspondence with the at least reference point shift; and
- determining a corrected prismatic draft design by optimizing the prescription surface depending on the user data,
- wherein determining the at least one object-side "actual" direction as the direction of the object-side portion of the main ray through the at least one shifted draft reference point takes place on the basis of the corrected prismatic draft design.

Preferably, the method comprises fabricating the spectacle lens with a centration marking, in particular a centration cross at the fitting point, and/or for indicating or marking the centration point.

Moreover, the invention provides a computer program product comprising a program code which, when loaded and executed in a computer system, is adapted to perform a method according to the present invention or a preferred embodiment thereof.

Furthermore, the invention provides a system for producing a prismatic spectacle lens, the system being adapted to perform a method according to the present invention or a preferred embodiment thereof.

In addition, the invention provides a prismatic spectacle lens or spectacle lens with prismatic power for a spectacle wearer, comprising a fitting point such that, for a correct centration of the spectacle lens for the spectacle wearer, it is located or is to be located horizontally in front of the pupil of the spectacle wearer in the position of wear of the spectacle lens in particular according to the individual user data and in the zero direction of sight of the spectacle wearer, wherein a centration marking, in particular a centration cross, is located at the fitting point.

Figure 2:
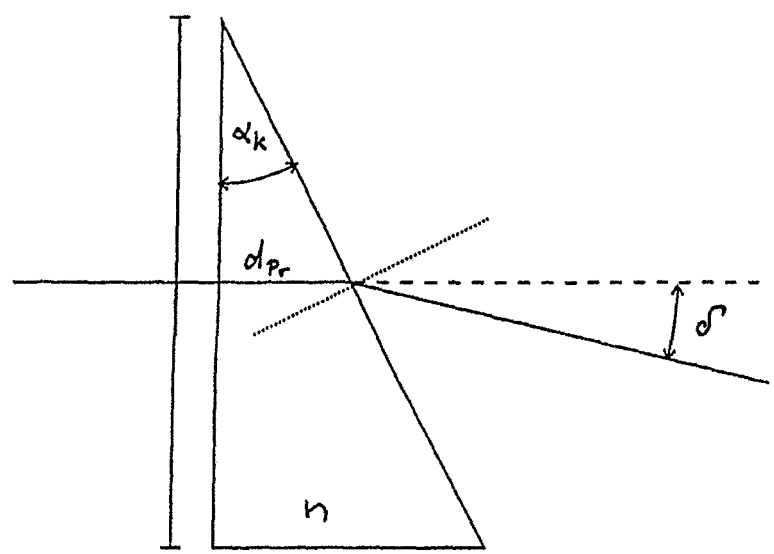
Figure 3:
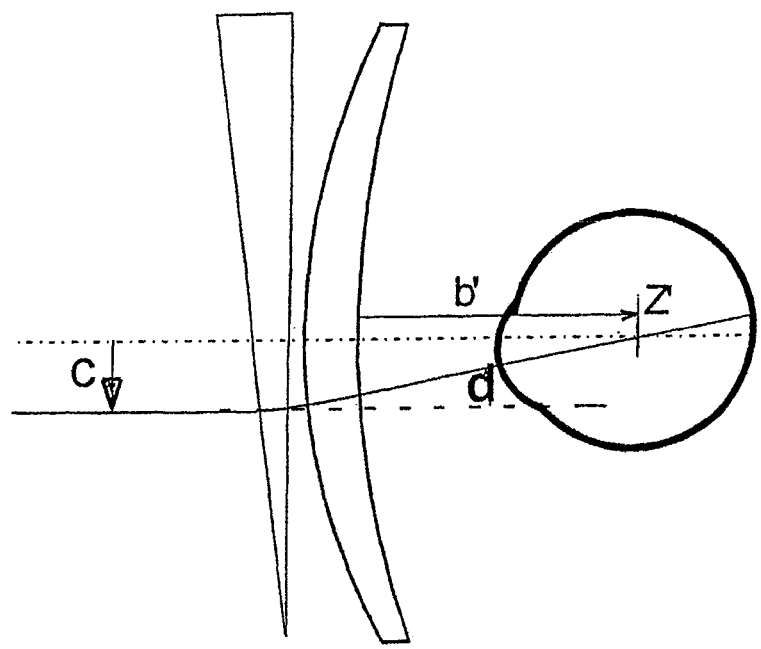

In the following, the invention will be exemplarily described with reference to accompanying drawings of preferred embodiments, which show:

FIG. 1 a schematic cross-section of a spectacle lens design, for illustrating a first preferred embodiment of the present invention;

FIG. 2 a schematic representation of a plano prism in a basic deflection as a background, for illustrating a second preferred embodiment of the present invention FIG. 3 a schematic representation of an influencing of the ray path by induction of a prismatic power for the spectacle lens; and FIG. 4 a schematic representation of a ray path in binocular vision through spectacles with exemplary prismatic spectacle lenses.

Figure 5:
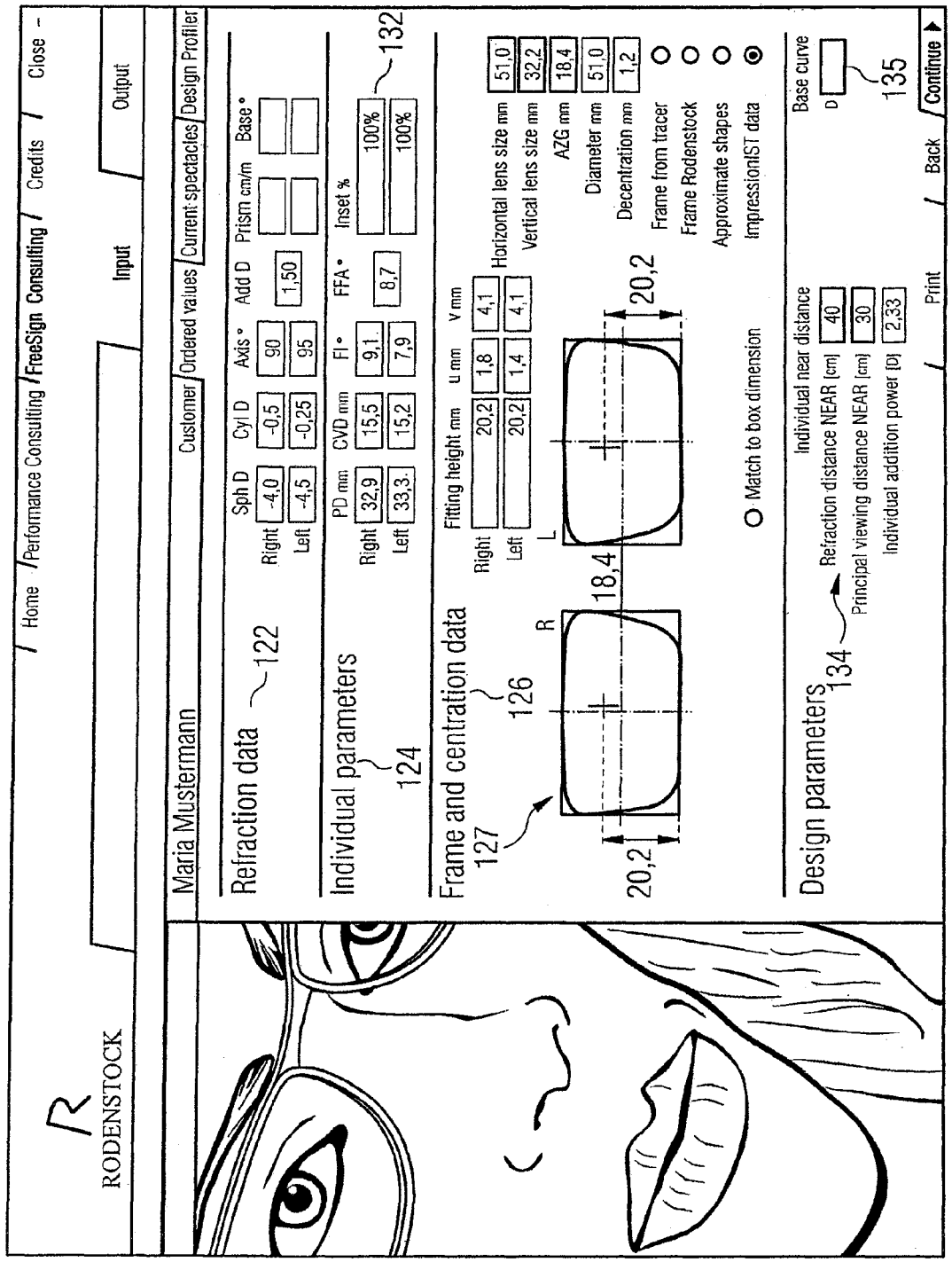
Figure 6:
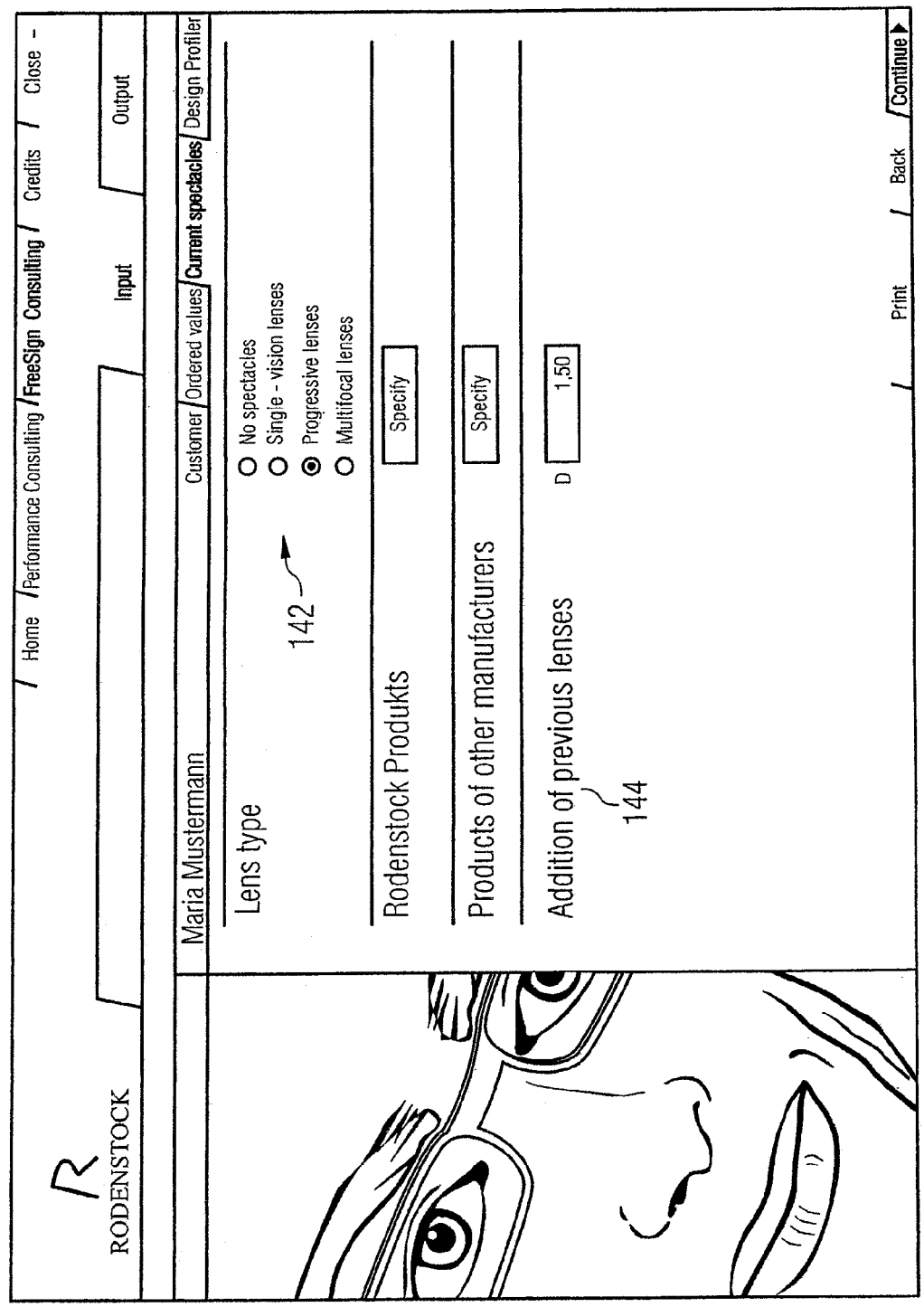
Figure 7:
Figure 8:
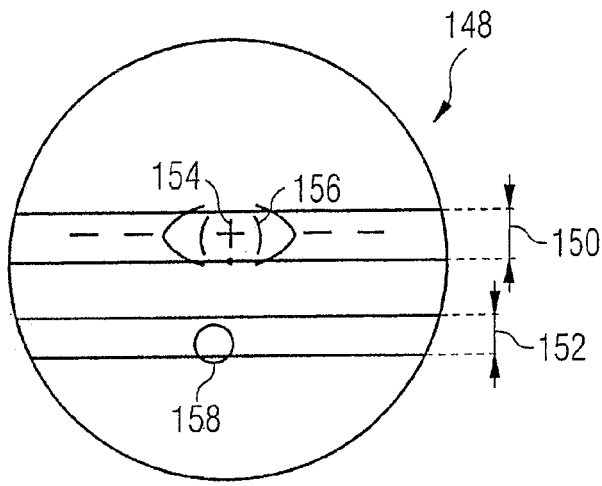
Figure 9:
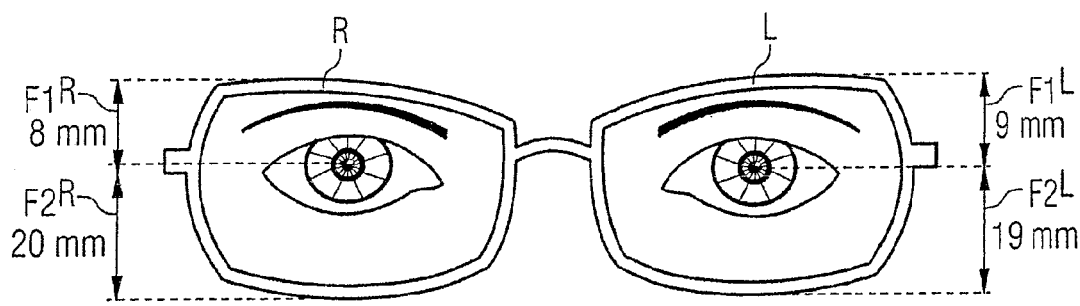
Figure 10A:
Figure 10B:
Figure 11:
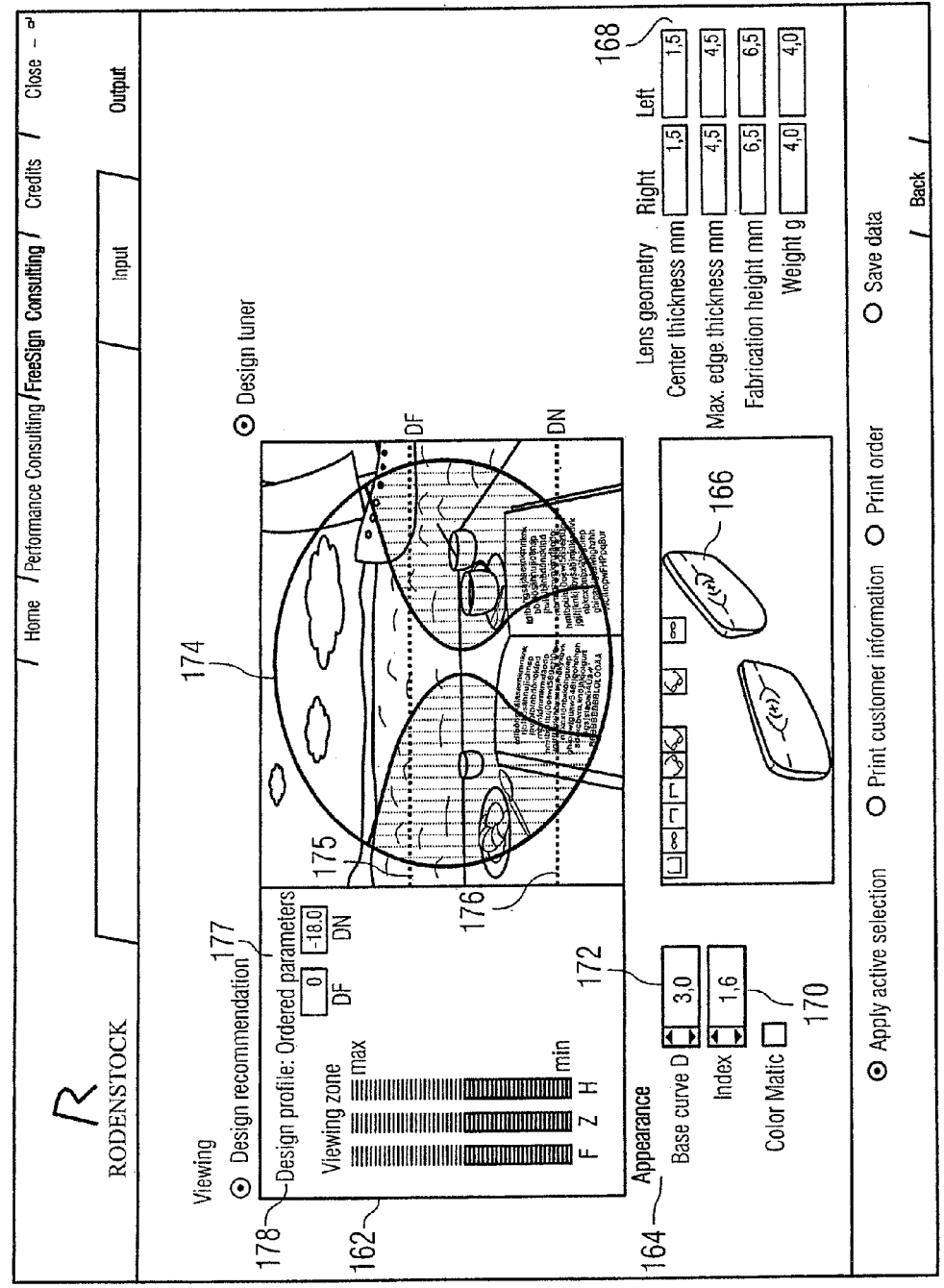
Figure 12:
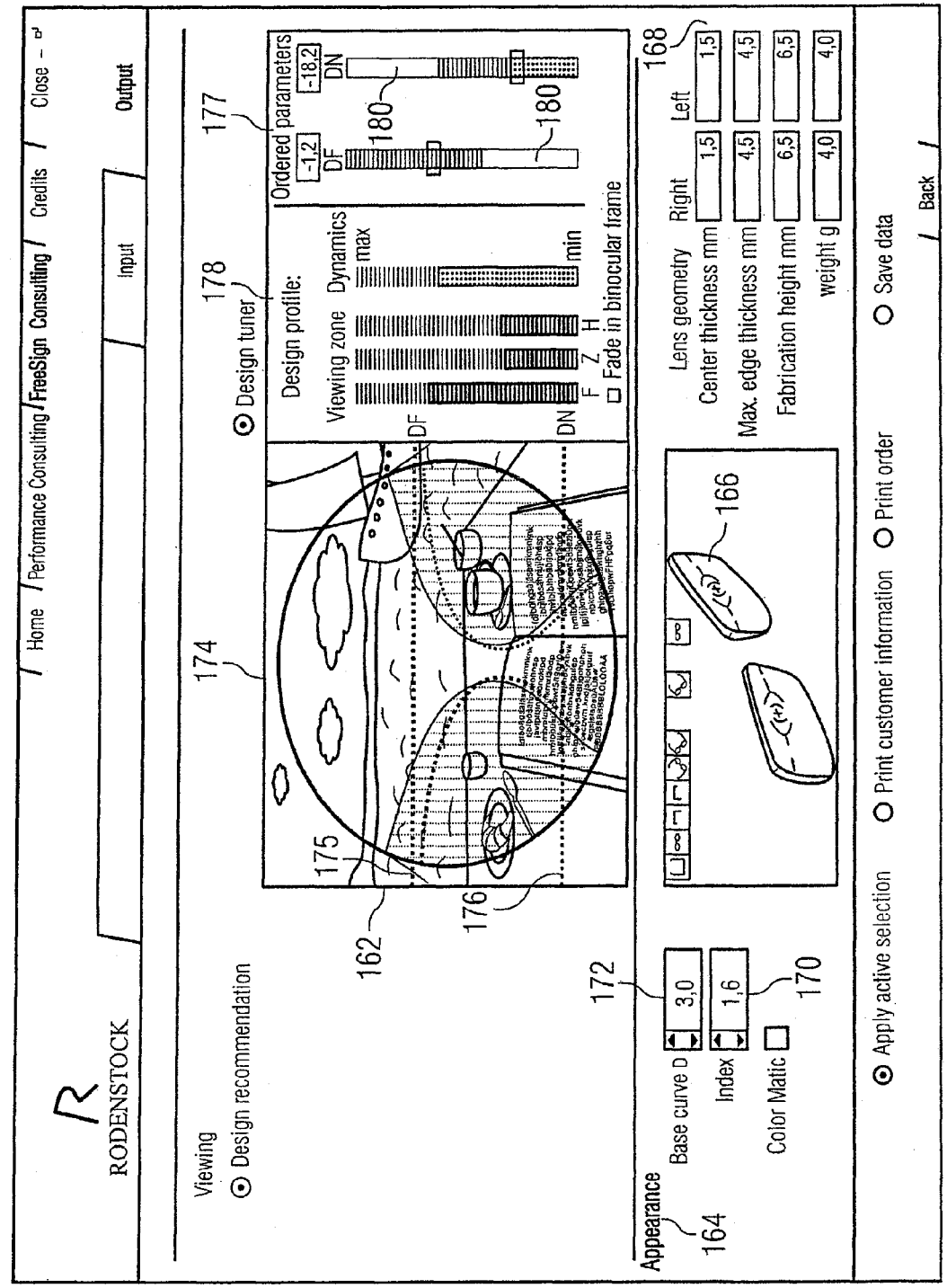
Figure 14:
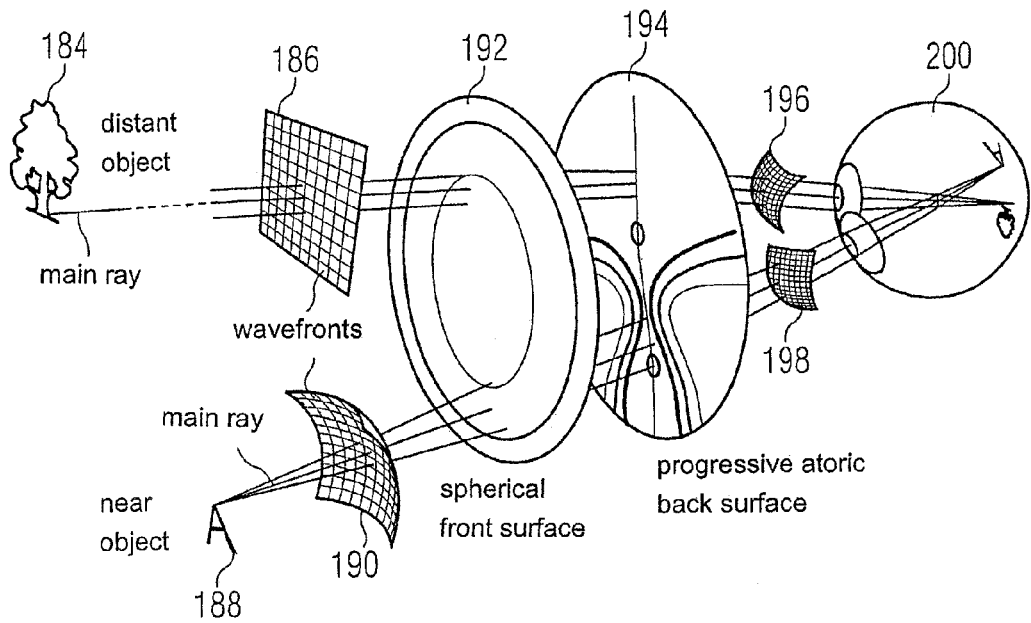
Figure 15A:
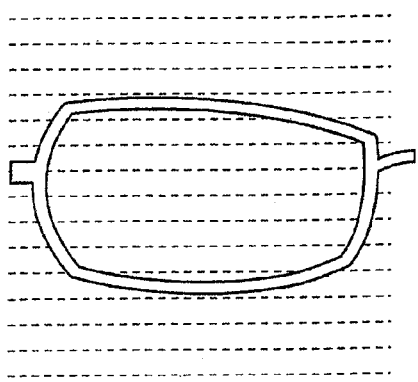
Figure 15B:
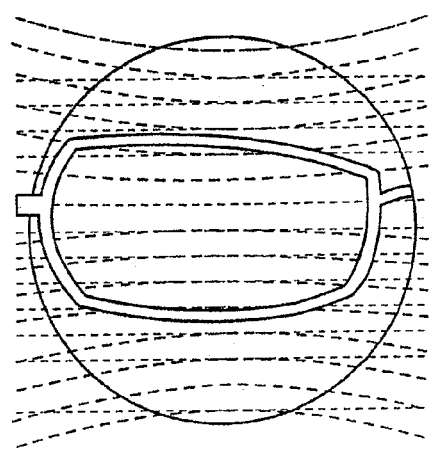
Figure 20A:
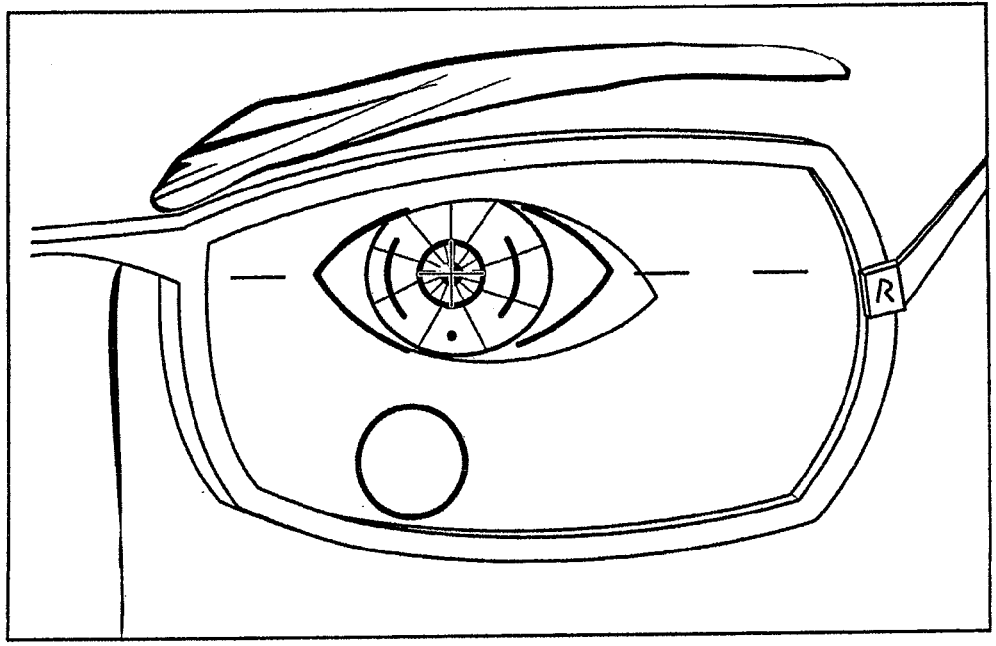
Figure 21A:
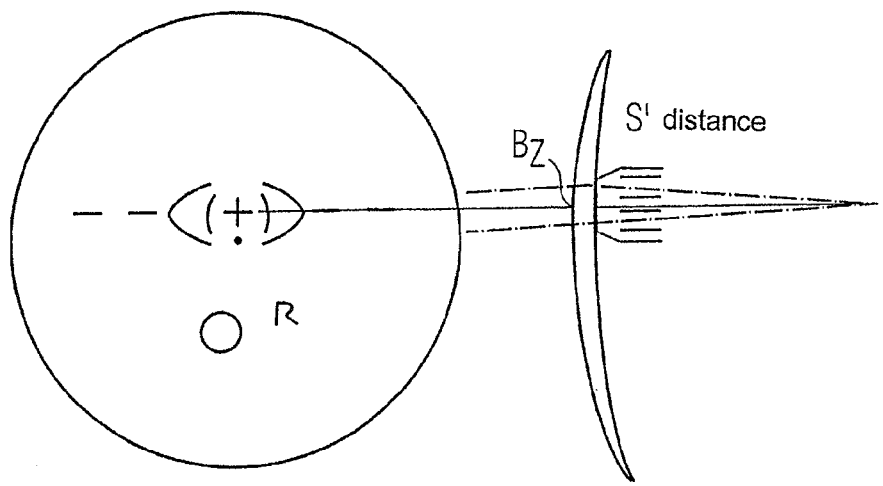
Figure 21B:
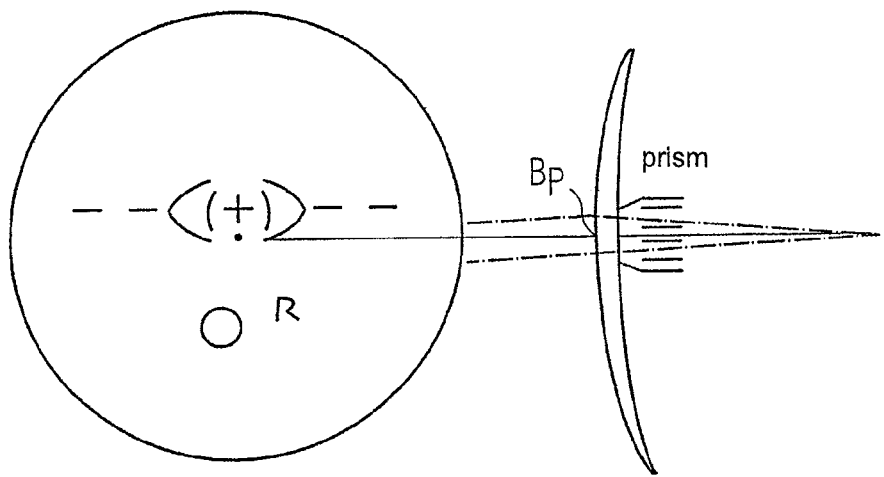
Figure 21C:
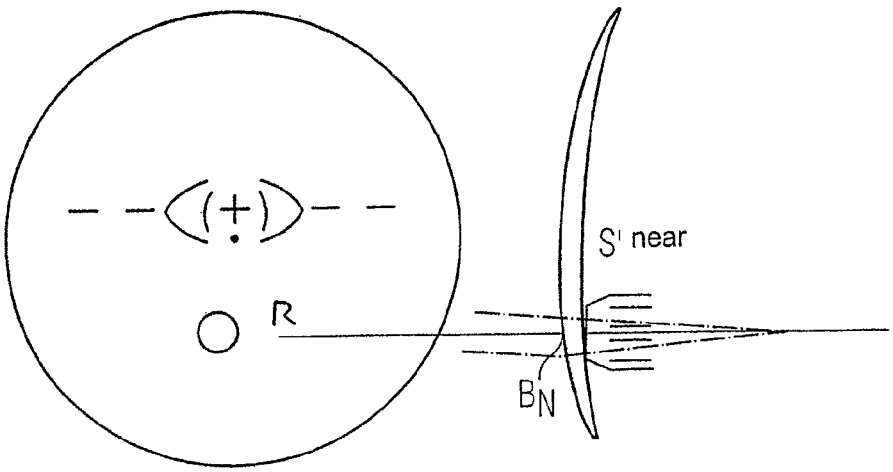

FIG. 5 an example of a mask or graphical user interface for inputting individual customer parameters;

FIG. 6 an example of a mask or graphical user interface for inputting data relating to the current spectacles;

FIG. 7 an example of a mask or graphical user interface for inputting data relating to the individual preferences and prioritization of the viewing zones;

FIG. 8 a schematic illustration of the positions of the distance and near reference points of an individual spectacle lens design;

FIG. 9 an example of different visual heights of the two eyes;

FIG. 10a,b a schematic illustration of the principal viewing distance near (FIG. 10a) and the refraction distance near (FIG. 10b);

FIG. 11 an example of a graphical user interface for the representation of results;

FIG. 12 an example of a graphical user interface for the representation of results and design modification or tuning;

FIG. 13 an example or an order form;

FIG. 14 a schematic illustration of the physiological and physical model of a spectacle lens in a specified position of wear;

FIG. 15a,b schematic illustrations of the axis positions in a spectacle lens without taking Listing's rule into account (FIG. 15a) and with Listing's rule considered (FIG. 15b);

FIGS. 16a,b two examples of non-permanent stampings of individually calculated progressive spectacle lenses;

FIG. 17 an example of a permanent engraving of a left, individually optimized, progressive spectacle lens;

FIG. 18 an example of a lens packet for an individually optimized spectacle lens;

FIG. 19 a key to the pictograms used on the lens packet;

FIGS. 20a,b examples of the centration of an individual spectacle lens (FIG. 20a) or a standard spectacle lens (FIG. 20b) in front of the wearer's eyes;

FIGS. 21a-c a schematic illustration of the measurement of the powers of an individual spectacle lens.

For a determination of a shift of reference points, in particular a reference point shift $c_B$, preferably a number of influencing parameters is taken into account. These comprise preferably individual prescription data, such as sphere, cylinder, axis, prism, base and/or addition, and/or individual data on the position of wear, such as corneal vertex distance (CVD), forward inclination and/or face form angle, and/or spectacle lens parameters, such as base curve, center thickness and/or refractive index. Preferably, at least some of these influencing parameters are sent to the manufacturer in particular when ordering the spectacle lens. Preferably, the manufacturer performs a method for fabricating a prismatic spectacle lens according to the present invention, in particular a preferred embodiment thereof, in particular taking into account the influencing parameters provided to them. Preferably, the manufacturer calculates the position of a visual point on the spectacle lens according to the fixation movement of the eyes of the spectacle wearer in an approximate or exact manner. The deviation from the original reference points, in particular a corresponding visual point for the same object ray direction, is preferably communicated to the customer or optician so that he/she does not only have to approximate a centration correction (BZ and thus the entire lens is shifted) but is also enabled to perform it with increased precision and in a simpler manner with the values and information (e.g. in the form fitting point markings) specified by the manufacturer.

In a preferred embodiment, in particular in the fabrication and optimization, particularly by the manufacturer, shifts, in particular reference point shifts $c_B$, of at least one reference point, preferably of all reference points, and viewing zones, except for the fitting point, are shifted in the lens in particular relative to the fitting point. When fitting the lenses, the optician does no longer have to distinguish between prismatic and non-prismatic spectacle lenses, which clearly facilitates the workflow and in addition eliminates a potential source of error.

A method according to a preferred embodiment of the present invention is described with reference to FIG. 1. Here, a draft design is taken as a basis which fulfills a plurality, preferably all, individual prescription data for the spectacle wearer, except for the prescribed prismatic power or prescription prism. For this draft design, a draft reference point, in particular a draft prism reference point $B_P$ and a fitting point $B_Z$ are specified on the front surface. Preferably, a Cartesian coordinate system (x-y-z) is specified, the x-y plane of which being preferably tangential to the front surface in the prism reference point $B_P$. The z axis is preferably perpendicular thereto. The coordinate origin is preferably specified in the prism reference point. Moreover, a zero axis of sight is specified along a zero direction of sight through the fitting point $B_Z$ with an ocular center of rotation Z' preferably according to individual user data. In particular, for provision of the draft design, the prescription surface (tilt and curvatures) is calculated without prism.

For the draft spectacle lens according to the draft design, i.e. without prism, the main ray is determined through the ocular center of rotation Z' and the prism reference point ($B_P=(p_{1x}, p_{1y})$), and its object-side direction is specified as the "target" direction $t_{1S}$. Subsequently, the prismatic power, in particular the prescription prism, is added, e.g. by tilting the rear surface in the coordinate system, and a starting value for the reference point shift c is determined according to the following formulas:

$$c_y = c_{90} = -\frac{b' p_y}{10} = -\frac{b' p_{90}}{10};$$

with $p_y = p_{90} = p \sin \beta$ a for a prism component with base position of 90°;

$$c_x = c_0 = -\frac{b' p_x}{10} = -\frac{b' p_0}{10}$$

with $p_x = p_0 = p \cos \beta$ for a prism component with base position of 0°.

The reference point shift $c=(c_x; c_y)$ and the ocular center of rotation distance b' are preferably used in units of mm, and the prism $p=(p_x; p_y)$ in the unit cm/m.

Preferably, together with the prism reference point $B_P$, further reference points, e.g. a distance reference point and/or near reference point, and/or viewing zones, e.g. a distance zone and/or a near zone and/or a channel zone of a progressive spectacle lens, are preferably shifted on the front surface, for example by the same values $c_x$ and $c_y$. Subsequently, the prescription surface is calculated again, and the main ray is determined through the shifted reference point $B_P$, as well as the resulting "actual" direction $t_1$.

In a preferred embodiment, a simultaneous iteration is performed in x and y, e.g. by means of a simple iteration (e.g. a Newton iteration) in (x1, y1), the reference point $B_P$ on the front surface is shifted (and the prescription surface is calculated again each time) until the "actual" direction $t_1$ and the "target" direction $t_{1s}$ match to a sufficient extent. The fitting point $B_Z$ remains unchanged.

For the shift, it particularly follows:

$$\bar{c} = \begin{pmatrix} c_x \\ c_y \end{pmatrix} = \begin{pmatrix} p_{2x} \\ p_{2y} \end{pmatrix} - \begin{pmatrix} p_{1x} \\ p_{1y} \end{pmatrix}$$

In a preferred embodiment, a separate iteration is performed in y and x. The outer iteration only runs over the y coordinate. In each horizontal section, the respective x coordinate of the penetration point of the main ray on the lens front surface is determined by means of the known methods (calculation of main line of sight), e.g. with the following steps specifying: $p_{2y} = y_{BP} + c_{90} = p_{1y} + c_{90}$
specifying a starting value $\Delta y = 0$
a) replacing $p_{2y}$ by $p_{2y} + 25\Delta y$
b) calculating prescription surface (tilt and curvature)
c) updating the main line of sight in height $p_{2y} => p_{2x}$, $c_x$
d) calculating the main ray from the ocular center of rotation through the prism reference point or shifted prism reference point
e) setting: $\Delta y = t_{1y} - t_{1Sy}$
f) if $\Delta y$ is sufficiently small, than cancel, otherwise repetition starting from a) with $c_y = p_{2y} - p_{1y}$ Frequently, an exact calculation of the vertical shift $c_y$ is of greater importance than the exact calculation of the horizontal shift $c_x$, since the fusion mechanisms of the pair of eyes are clearly limited in the vertical direction and the induced vertical prism differences may therefore lead to incompatibilities (asthenopic disorders, double images) at significantly smaller values (e.g. 0.5 cm/m).

If the manufacturer is not able to perform a main ray iteration in the position of wear due to missing data or calculating tools, the vertical shifting may be calculated with the following set of formulas with reference to FIG. 4:
angle of deflection $$\delta = -\frac{p_y}{100}(p_y \text{ in cm/m}) \quad (1)$$

wedge angle $$\alpha_K = \frac{\delta}{n-1} \quad (2)$$

thickness prism wedge $$d_{Pr} = \frac{\varnothing |\tan\alpha_K|}{2} \approx \frac{\varnothing |\alpha_K|}{2} \quad (3)$$

with a spectacle lens diameter $\varnothing$ (in mm), $$z_K = b' + \frac{e+10}{100}(b' + d_{Pr} + d_{min} + \max(0, S'))\cos\alpha_V \quad (4)$$

with an ocular center of rotation distance b' (in mm), a corneal vertex distance e (in mm), a minimum thickness $d_{min}$ of the spectacle lens (in mm), a mean refractive power S' of the spectacle lens (in D), $$\Delta y_1 = y_{BP} - y_{BZ} \quad (5)$$

with a vertical position component $y_{BP}$ of the optical draft reference point (in mm) and a vertical position component $y_{BZ}$ of the fitting point, $$\varphi_1 = \arctan\left(\frac{\Delta y_1}{z_K}\right) \quad (6)$$

$$\varphi_2 = \varphi_1 + \delta \quad (7)$$

$$\Delta y_2 = z_K \tan\varphi_2 \quad (8)$$

$$=> c_y = \Delta y_2 - \Delta y_1 \quad (9)$$

with:

e corneal vertex distance (e.g. 13 mm)

b' ocular center of rotation distance (e.g. e+13.5)

$d_R$ edge thickness of the lens $d_{min}$ minimum spectacle lens thickness (in particular minimum edge thickness of the spectacle lens)

$y_{BP}$ y coordinate prism reference point ($P_{1y}$)

$y_{BZ}$ y coordinate centration point $\alpha_v$ forward inclination of the lens (e.g. 9°/180*)

$c_y$ vertical shift

The improvement that can be achieved by the present invention shows an exemplary, systematic calculation of 90 lenses.

Refractive index n=1.597, lens diameter=65 mm, fitting point (or centration point)

BZ=(0; 4 mm), prism reference point BP=(0,0)

5 different powers S': −10.0 D, −5.0 D, 0.0 D, +5.0 D, +10.0 D 2 different vertical prisms: P90: −6.0 cm/m, +6.0 cm/m 3 different forward inclinations: 0°, 10°, 20°

3 different corneal vertex distances e: 8 mm, 14 mm, 20 mm

The vertical shift was determined for each lens by means of iteration methods in a preferred embodiment of the present invention, as described above, and then compared to other preferred calculating methods for the vertical component $c_v$ of the determined decentration c, which are listed in table 1. The deviations of these other preferred methods from the preferred iteration method are summarized in the form of statistic mean values on all 90 exemplary lenses in table 1. Table 2 shows the corresponding comparative values of the decentration c for all 90 lenses individually.

TABLE 1

| | method | root mean square of the deviations | greatest single error |
|---|---|---|---|
| 1 | $c_v = 0.25 p$ | 0.41 mm | 0.82 mm |
| 2 | $c_v = 0.3 p$ | 0.31 mm | 0.51 mm |
| 3 | $c_v = \frac{b'p}{10}$ | 0.14 mm | 0.30 mm |
| 4 | $c_v = \frac{(e+15)p}{10}$ | 0.07 mm | 0.21 mm |
| 5 | above set of formulas (1) to (9) | 0.04 mm | 0.09 mm |

TABLE 2

| sph. | forw. incl. | Pr90 | CVD | iterative | Pro CM/M | method 1 | method 2 | method 3 | method 4 | method 5 |
|---|---|---|---|---|---|---|---|---|---|---|
| −10.00 | 0.00 | −6.00 | 20.0 | 2.07 | 0.34 | −0.57 | −0.27 | −0.06 | 0.03 | 0.03 |
| −10.00 | 0.00 | −6.00 | 14.0 | 1.72 | 0.29 | −0.22 | 0.08 | −0.07 | 0.02 | 0.01 |
| −10.00 | 0.00 | −6.00 | 8.0 | 1.38 | 0.23 | 0.12 | 0.42 | −0.09 | 0.00 | −0.02 |
| −10.00 | 10.00 | −6.00 | 20.0 | 2.05 | 0.34 | −0.55 | −0.25 | −0.04 | 0.05 | 0.04 |
| −10.00 | 10.00 | −6.00 | 14.0 | 1.69 | 0.28 | −0.19 | 0.11 | −0.04 | 0.05 | 0.03 |
| −10.00 | 10.00 | −6.00 | 8.0 | 1.34 | 0.22 | 0.16 | 0.46 | −0.05 | 0.04 | 0.02 |
| −10.00 | 20.00 | −6.00 | 20.0 | 2.10 | 0.35 | −0.60 | −0.30 | −0.09 | 0.00 | −0.04 |
| −10.00 | 20.00 | −6.00 | 14.0 | 1.71 | 0.29 | −0.21 | 0.09 | −0.06 | 0.03 | −0.01 |
| −10.00 | 20.00 | −6.00 | 8.0 | 1.34 | 0.22 | 0.16 | 0.46 | −0.05 | 0.04 | 0.01 |
| −5.00 | 0.00 | −6.00 | 20.0 | 2.07 | 0.34 | −0.57 | −0.27 | −0.06 | 0.03 | 0.03 |
| −5.00 | 0.00 | −6.00 | 14.0 | 1.72 | 0.29 | −0.22 | 0.08 | −0.07 | 0.02 | 0.01 |
| −5.00 | 0.00 | −6.00 | 8.0 | 1.38 | 0.23 | 0.12 | 0.42 | −0.09 | 0.00 | −0.02 |
| −5.00 | 10.00 | −6.00 | 20.0 | 2.05 | 0.34 | −0.55 | −0.25 | −0.04 | 0.05 | 0.04 |
| −5.00 | 10.00 | −6.00 | 14.0 | 1.69 | 0.28 | −0.19 | 0.11 | −0.04 | 0.05 | 0.04 |
| −5.00 | 10.00 | −6.00 | 8.0 | 1.34 | 0.22 | 0.17 | 0.46 | −0.05 | 0.04 | 0.02 |
| −5.00 | 20.00 | −6.00 | 20.0 | 2.09 | 0.35 | −0.59 | −0.29 | −0.08 | 0.01 | −0.03 |
| −5.00 | 20.00 | −6.00 | 14.0 | 1.71 | 0.28 | −0.21 | 0.09 | −0.06 | 0.03 | 0.00 |
| −5.00 | 20.00 | −6.00 | 8.0 | 1.33 | 0.22 | 0.17 | 0.47 | −0.04 | 0.05 | 0.01 |
| 0.00 | 0.00 | −6.00 | 20.0 | 2.09 | 0.35 | −0.58 | −0.29 | −0.08 | 0.01 | 0.01 |
| 0.00 | 0.00 | −6.00 | 14.0 | 1.73 | 0.29 | −0.23 | 0.07 | −0.08 | 0.01 | 0.00 |
| 0.00 | 0.00 | −6.00 | 8.0 | 1.39 | 0.23 | 0.12 | 0.41 | −0.10 | −0.01 | −0.02 |
| 0.00 | 10.00 | −6.00 | 20.0 | 2.06 | 0.34 | −0.56 | −0.26 | −0.05 | 0.04 | 0.03 |
| 0.00 | 10.00 | −6.00 | 14.0 | 1.69 | 0.28 | −0.19 | 0.11 | −0.04 | 0.05 | 0.03 |
| 0.00 | 10.00 | −6.00 | 8.0 | 1.33 | 0.22 | 0.16 | 0.47 | −0.04 | 0.05 | 0.02 |
| 0.00 | 20.00 | −6.00 | 20.0 | 2.11 | 0.35 | −0.61 | −0.31 | −0.10 | −0.01 | −0.05 |
| 0.00 | 20.00 | −6.00 | 14.0 | 1.72 | 0.29 | −0.22 | 0.08 | −0.07 | 0.02 | −0.01 |
| 0.00 | 20.00 | −6.00 | 8.0 | 1.33 | 0.22 | 0.16 | 0.47 | −0.04 | 0.05 | 0.02 |
| 5.00 | 0.00 | −6.00 | 20.0 | 2.13 | 0.36 | −0.62 | −0.33 | −0.12 | −0.03 | 0.05 |
| 5.00 | 0.00 | −6.00 | 14.0 | 1.77 | 0.29 | −0.26 | 0.03 | −0.12 | −0.03 | 0.03 |
| 5.00 | 0.00 | −6.00 | 8.0 | 1.41 | 0.24 | 0.10 | 0.39 | −0.12 | −0.03 | 0.01 |
| 5.00 | 10.00 | −6.00 | 20.0 | 2.10 | 0.35 | −0.60 | −0.30 | −0.09 | 0.00 | 0.08 |
| 5.00 | 10.00 | −6.00 | 14.0 | 1.72 | 0.29 | −0.23 | 0.08 | −0.07 | 0.02 | 0.07 |
| 5.00 | 10.00 | −6.00 | 8.0 | 1.35 | 0.23 | 0.15 | 0.45 | −0.06 | 0.03 | 0.06 |
| 5.00 | 20.00 | −6.00 | 20.0 | 2.15 | 0.36 | −0.66 | −0.35 | −0.14 | −0.05 | −0.01 |
| 5.00 | 20.00 | −6.00 | 14.0 | 1.75 | 0.29 | −0.26 | 0.05 | −0.10 | −0.01 | 0.02 |
| 5.00 | 20.00 | −6.00 | 8.0 | 1.35 | 0.22 | 0.14 | 0.45 | −0.06 | 0.03 | 0.05 |
| 10.00 | 0.00 | −6.00 | 20.0 | 2.28 | 0.38 | −0.77 | −0.48 | −0.27 | −0.18 | −0.01 |
| 10.00 | 0.00 | −6.00 | 14.0 | 1.89 | 0.32 | −0.38 | −0.09 | −0.24 | −0.15 | −0.02 |
| 10.00 | 0.00 | −6.00 | 8.0 | 1.51 | 0.25 | 0.01 | 0.29 | −0.22 | −0.13 | −0.04 |
| 10.00 | 10.00 | −6.00 | 20.0 | 2.24 | 0.37 | −0.74 | −0.44 | −0.23 | −0.14 | 0.03 |
| 10.00 | 10.00 | −6.00 | 14.0 | 1.84 | 0.31 | −0.34 | −0.04 | −0.19 | −0.10 | 0.03 |
| 10.00 | 10.00 | −6.00 | 8.0 | 1.44 | 0.24 | 0.06 | 0.36 | −0.15 | −0.06 | 0.03 |
| 10.00 | 20.00 | −6.00 | 20.0 | 2.30 | 0.38 | −0.80 | −0.50 | −0.29 | −0.20 | −0.07 |
| 10.00 | 20.00 | −6.00 | 14.0 | 1.86 | 0.31 | −0.38 | −0.06 | −0.21 | −0.12 | −0.03 |
| 10.00 | 20.00 | −6.00 | 8.0 | 1.44 | 0.24 | 0.05 | 0.36 | −0.15 | −0.06 | 0.01 |
| −10.00 | 0.00 | 6.00 | 20.0 | −2.18 | 0.36 | 0.68 | 0.38 | 0.17 | 0.08 | 0.05 |
| −10.00 | 0.00 | 6.00 | 14.0 | −1.83 | 0.31 | 0.33 | 0.03 | 0.18 | 0.09 | 0.07 |
| −10.00 | 0.00 | 6.00 | 8.0 | −1.48 | 0.25 | −0.01 | −0.32 | 0.19 | 0.10 | 0.09 |
| −10.00 | 10.00 | 6.00 | 20.0 | −2.09 | 0.35 | 0.59 | 0.29 | 0.08 | −0.01 | −0.03 |
| −10.00 | 10.00 | 6.00 | 14.0 | −1.74 | 0.29 | 0.24 | −0.06 | 0.09 | 0.00 | −0.01 |
| −10.00 | 10.00 | 6.00 | 8.0 | −1.40 | 0.23 | −0.10 | −0.40 | 0.11 | 0.02 | 0.01 |
| −10.00 | 20.00 | 6.00 | 20.0 | −2.06 | 0.34 | 0.56 | 0.26 | 0.05 | −0.04 | −0.03 |
| −10.00 | 20.00 | 6.00 | 14.0 | −1.70 | 0.28 | 0.20 | −0.10 | 0.05 | −0.04 | −0.03 |
| −10.00 | 20.00 | 6.00 | 8.0 | −1.35 | 0.22 | −0.15 | −0.45 | 0.06 | −0.03 | −0.03 |
| −5.00 | 0.00 | 6.00 | 20.0 | −2.16 | 0.36 | 0.66 | 0.36 | 0.15 | 0.06 | 0.04 |
| −5.00 | 0.00 | 6.00 | 14.0 | −1.81 | 0.30 | 0.31 | 0.01 | 0.16 | 0.07 | 0.06 |
| −5.00 | 0.00 | 6.00 | 8.0 | −1.47 | 0.25 | −0.03 | −0.33 | 0.18 | 0.09 | 0.08 |
| −5.00 | 10.00 | 6.00 | 20.0 | −2.08 | 0.35 | 0.57 | 0.28 | 0.07 | −0.02 | −0.04 |
| −5.00 | 10.00 | 6.00 | 14.0 | −1.73 | 0.29 | 0.23 | −0.07 | 0.08 | −0.01 | −0.03 |
| −5.00 | 10.00 | 6.00 | 8.0 | −1.38 | 0.23 | −0.12 | −0.42 | 0.09 | 0.00 | −0.01 |
| −5.00 | 20.00 | 6.00 | 20.0 | −2.05 | 0.34 | 0.55 | 0.25 | 0.04 | −0.05 | −0.04 |
| −5.00 | 20.00 | 6.00 | 14.0 | −1.69 | 0.28 | 0.19 | −0.11 | 0.04 | −0.05 | −0.04 |
| −5.00 | 20.00 | 6.00 | 8.0 | −1.34 | 0.22 | −0.17 | −0.46 | 0.05 | −0.04 | −0.04 |
| 0.00 | 0.00 | 6.00 | 20.0 | −2.16 | 0.36 | 0.66 | 0.36 | 0.15 | 0.06 | 0.04 |
| 0.00 | 0.00 | 6.00 | 14.0 | −1.81 | 0.30 | 0.31 | 0.01 | 0.16 | 0.07 | 0.05 |
| 0.00 | 0.00 | 6.00 | 8.0 | −1.46 | 0.24 | −0.04 | −0.34 | 0.17 | 0.08 | 0.06 |
| 0.00 | 10.00 | 6.00 | 20.0 | −2.08 | 0.35 | 0.58 | 0.28 | 0.07 | −0.02 | −0.04 |
| 0.00 | 10.00 | 6.00 | 14.0 | −1.72 | 0.29 | 0.22 | −0.08 | 0.07 | −0.02 | −0.03 |
| 0.00 | 10.00 | 6.00 | 8.0 | −1.37 | 0.23 | −0.13 | −0.43 | 0.08 | −0.01 | −0.02 |
| 0.00 | 20.00 | 6.00 | 20.0 | −2.06 | 0.34 | 0.55 | 0.26 | 0.05 | −0.04 | −0.02 |
| 0.00 | 20.00 | 6.00 | 14.0 | −1.70 | 0.28 | 0.19 | −0.10 | 0.05 | −0.04 | −0.03 |
| 0.00 | 20.00 | 6.00 | 8.0 | −1.33 | 0.22 | −0.18 | −0.47 | 0.04 | −0.05 | −0.04 |
| 5.00 | 0.00 | 6.00 | 20.0 | −2.19 | 0.37 | 0.69 | 0.39 | 0.18 | 0.09 | −0.03 |
| 5.00 | 0.00 | 6.00 | 14.0 | −1.82 | 0.30 | 0.33 | 0.02 | 0.17 | 0.08 | −0.01 |
| 5.00 | 0.00 | 6.00 | 8.0 | −1.46 | 0.24 | −0.03 | −0.34 | 0.17 | 0.08 | 0.01 |
| 5.00 | 10.00 | 6.00 | 20.0 | −2.12 | 0.35 | 0.61 | 0.32 | 0.11 | 0.02 | −0.09 |
| 5.00 | 10.00 | 6.00 | 14.0 | −1.75 | 0.29 | 0.24 | −0.05 | 0.10 | 0.01 | −0.08 |

TABLE 2-continued

| 5.00 | 10.00 | 6.00 | 8.0 | −1.38 | 0.23 | −0.12 | −0.42 | 0.09 | 0.00 | −0.06 |
| 5.00 | 20.00 | 6.00 | 20.0 | −2.12 | 0.35 | 0.60 | 0.32 | 0.11 | 0.02 | −0.05 |
| 5.00 | 20.00 | 6.00 | 14.0 | −1.74 | 0.29 | 0.21 | −0.06 | 0.09 | 0.00 | −0.06 |
| 5.00 | 20.00 | 6.00 | 8.0 | −1.36 | 0.23 | −0.17 | −0.44 | 0.07 | −0.02 | −0.07 |
| 10.00 | 0.00 | 6.00 | 20.0 | −2.31 | 0.39 | 0.82 | 0.51 | 0.30 | 0.21 | 0.01 |
| 10.00 | 0.00 | 6.00 | 14.0 | −1.92 | 0.32 | 0.43 | 0.12 | 0.27 | 0.18 | 0.02 |
| 10.00 | 0.00 | 6.00 | 8.0 | −1.53 | 0.25 | 0.04 | −0.27 | 0.24 | 0.15 | 0.03 |
| 10.00 | 10.00 | 6.00 | 20.0 | −2.26 | 0.38 | 0.74 | 0.46 | 0.25 | 0.16 | −0.03 |
| 10.00 | 10.00 | 6.00 | 14.0 | −1.86 | 0.31 | 0.35 | 0.06 | 0.21 | 0.12 | −0.03 |
| 10.00 | 10.00 | 6.00 | 8.0 | −1.46 | 0.24 | −0.05 | −0.34 | 0.17 | 0.08 | −0.03 |
| 10.00 | 20.00 | 6.00 | 20.0 | −2.30 | 0.38 | 0.75 | 0.50 | 0.29 | 0.20 | 0.04 |
| 10.00 | 20.00 | 6.00 | 14.0 | −1.88 | 0.31 | 0.34 | 0.08 | 0.23 | 0.14 | 0.01 |
| 10.00 | 20.00 | 6.00 | 8.0 | −1.46 | 0.24 | −0.08 | −0.34 | 0.17 | 0.08 | −0.01 |

| sph. | forw. incl. | Pr90 | CVD | exact | Pro CM/M | d(N1) | d(N1) | d(N2) | d(N3) | d(N4) |
|---|---|---|---|---|---|---|---|---|---|---|
| error: | | | | | | | | | | |
| arithmetic mean | | | | | 0.29 | 0.01 | 0.02 | 0.02 | 0.02 | 0.00 |
| root mean square | | | | | 0.30 | 0.41 | 0.31 | 0.14 | 0.07 | 0.04 |
| greatest error | | | | | | 0.82 | 0.51 | 0.30 | 0.21 | 0.09 |

In a further aspect of the invention, for the determination of a centration shift and/or a decentration for spectacle lenses, in particular a set of individual parameters with respect to a frame of the spectacle wearer is taken into account. A preferred method with respect to this aspect could be applied both to prismatic and non-prismatic spectacle lenses, i.e. with and without prismatic prescription. If, in addition to the simple individual parameters, the manufacturer also knows in particular the frame data (distance between the lenses, horizontal lens size and vertical lens size, face form angle), the pupillary distance and the centration data, then the normal centration may be taken into account in the shift as well. The optician would then be able to fit each lens in a centered manner, i.e. without any decentration, and the reference points would then be in the correct position in front of the eye. In spectacle lenses with an individual prescription surface, this would have the additional advantage that the stock of blanks of the manufacturer could be reduced considerably, since the lenses would no longer have to be decentered and the lens diameters would only depend on the frame size. In particular in lenses for sports eyewear with a high base curve, large face form angle and large horizontal lens size, this would be an additional major simplification for the optician in the centration and the frame selection (the available lens diameter does no longer constitute a restriction).

Further features and advantages of preferred embodiments of the invention will be described in the following in more detail on the basis of non-limiting examples.

In the following, the individually determinable distance and near reference points will be referred to as design point "distance" and design point "near", respectively. In particular, the individually determined distance reference point or design point "distance" corresponds to the point by which the wearer is optimally corrected in their distance vision and which corresponds to the personal viewing habits of the wearer. The individually determined near reference point or design point "near" corresponds to the point by which the wearer is optimally corrected in their near vision and can lower their views as comfortable to them.

Conventional progressive spectacle lenses (multifocal lenses) usually comprise a progressive front surface, while the prescription surface on the eye-side is fabricated after receipt of order. In the fabrication according to the base curve system, a limited number (e.g. 72) of progressive surfaces is used, which are adapted to visual defects, are prefabricated and thus standardized. However, these do not apply separately to each power, but to a certain spectrum of the power range. The optimization of the progressive surfaces only takes place for the mean power per base curve or power range. If the refraction data deviates from the optimized powers, it results in restrictions of the usable viewing zones.

In conventional progressive lenses, already small deviations of the ordered powers in sphere, cylinder, axis or also prism and base from the calculation underlying the blank restrict the possibility that a design lives on, which may cause discomfort with the user. In addition, the optimization of conventional progressive lenses is only based on standard values which often do not satisfy the individuality of the lens, frame and customer data of the wearer.

In the power-optimized progressive lenses, the disadvantages of the conventional progressive lenses are eliminated by an aspherical or atoric prescription surface optimized online for each power combination individually. By means of the Freiformtechnologie (free form technology), it is possible to fabricate power-optimized progressive lenses. Depending on the calculation and fabrication know-how, individual progressive lenses may be fabricated with the Freiformtechnologie as well.

Furthermore, individual progressive lenses are known which can be optimized and calculated taking the individual prescription (sph, cyl, axis, add, prism, base) and the individual positions of the lenses in front of the wearer's eye (CVD, FFA, forward inclination, pupillary distance) into consideration.

A second group of individual progressive lenses is progressive lenses personalized in a different manner, e.g. by personal behaviors of the wearer or their preferences. However, these progressive lenses do not or only partly consider the individual parameters. These progressive lenses are based on a physiognomic standard model usually not corresponding to the actual circumstances and thus leading to optical deviations and/or performance losses.

In all cases however, the design of a progressive spectacle lens has been fixedly defined so far. With a preferred inventive method, it is possible to tailor the spectacle lens design to the customer needs, wherein individual customer parameters (e.g. pupillary distance (PD), corneal vertex distance (CVD), frame shape, forward inclination (FI), face form angle, individual position of the distance and/or a near reference point, individual near distance, etc.) are taken into consideration.

Preferably, the viewing experience and the needs or vision needs of a customer are taken into account in a preferred inventive method for calculating an individual design and for manufacturing a spectacle lens. Thus, it is possible to create an individual progressive spectacle lens using the technical know-how e.g. of an optician with the collaboration of the customer (spectacle wearer). Preferably, advantages and disadvantages of the previous model are taken into consideration.

The individual parameters (e.g. pupillary distance PD, corneal vertex distance CVD, forward inclination FI, face form angle FFA, etc.), which are for example automatically determined by means of a suitable 3D measuring apparatus, such as by means of the 3D video centering apparatus ImpressionIST by the company Rodenstock GmbH, or alternatively by means of conventional measuring tools, are taken into account in the calculation or optimization of the spatial positions, in particular the vertical and/or the horizontal position of the distance and/or the near reference point.

The individual parameters may vary in the following ranges:
pupillary distance (PD): 30 to 80 mm
corneal vertex distance (CVD): 3 to 50 mm
forward inclination (FI): −10 to +20 degrees
face form angle (FFA): −10 to +35 degrees.

Moreover, the special viewing habits of the spectacle wearer may be considered in addition to the individual parameters.

FIGS. 5 to 7 show graphical user interfaces for inputting individual customer parameters.

For example, in a first mask or graphical user interface (not shown), information on the customer (e.g. name, contact address, frame selection, etc.) can be input or e.g. be imported from a database. The selected frame, which can be directly measured by means of a suitable tracer (e.g. ImpressionIST by the company Rodenstock) or be retrieved from a database, can also be displayed.

FIG. 5 shows an example of a mask or graphical user interface 120 for inputting individual data (prescription values) of the spectacle wearer. The individual data can directly be input into the corresponding input fields or sections of the mask or graphical user interface, or be e.g. retrieved from a database. The fields with a gray background are automatically calculated and filled with data by the program.

The graphical user interface 120 shown in FIG. 5 includes:
a section "refraction data" (section 122) comprising input fields for inputting individual refraction data, such as sphere "sph", cylinder "cyl", axis, prism, base);
a section "individual parameters" (section 124) comprising input fields for inputting individual parameters of the spectacle wearer's eyes and/or the individual position of wear (pupillary distance "PD", corneal vertex distance "CVD", forward inclination "FI", face form angle "FFA");
a section "frame and centration data" (section 126) comprising input fields for inputting frame and centration data (fitting height, horizontal lens size, vertical lens size, distance between lenses "AZG") and optionally a display section (section 127) for displaying the centration of the spectacles matched to the box dimension.

The frame data can be input into corresponding input fields. These values can be entered automatically if the frame is e.g. selected by means of a tracer or from a list of frames. The centration data can optionally directly be applied from a 3D video centering system (e.g. 3D video centering system by the company Rodenstock GmbH). With a function "match to box dimension", the frame can be matched to the possibly changed frame data.

In section 126 "frame and centration data", a frame can be selected from a database e.g. if no frame has been applied or measured by means of a tracer before. In particular, the frame can be selected from a list in an opening pop-up window. The shape and frame data are preferably displayed as well. The selection can be applied by confirming it. Also, an approximate frame can be selected from a number of different frame shapes ("approximate shapes"). Here, another pop-up window may open in which the frame can be selected from a choice of common shapes.

The graphical user interface 120 shown in FIG. 5 further comprises a section or input field "Inset" (section 132). If the spectacle wearer has a convergence behavior in near vision deviating from the standard case, the default value in the input field "Inset" can be changed as appropriate. Preferably, the inset value is calculated considering the individual customer parameters.

Also, the graphical user interface 120 comprises a section 134 "Design Parameter" with corresponding input fields for inputting:
the individual near distance in the refraction determination (refraction distance near);
the principal viewing distance near; and
the individual addition power.

If no data regarding the individual near distance are input, it is assumed that up to an addition of 2.5 D, the individual near distance is 40 cm in the refraction determination. In other words, it is assumed that the ordered addition was determined in 40 cm and that also the principal viewing distance of the spectacle wearer is at this distance. In the case of higher additions, the reciprocal of the addition corresponds to the maximum near distance. If only one of the two input fields "Refraction Distance Near" and "Principal Viewing Distance Near" is filled, it is assumed that the value also holds true for the respective other distance. The inset and the astigmatism are calculated for the principal viewing distance "near".

If different values for the refraction distance "near" and the principal viewing distance "near" are entered into the corresponding input fields, the individual addition power for the principal viewing distance is automatically calculated as well. The individual addition power is displayed if it lies outside the delivery range (0.75 D to 3.50 D) or deviates more than 0.5 D from the ordered addition.

EXAMPLE ordered addition (refraction)=2.00 D, principal viewing distance near=30 cm, refraction distance near=40 cm. The ordered addition of 2.00 D is optimized for 30 cm and the addition is adapted. In addition to the inset, the astigmatism of oblique incidence is corrected for the desired principal viewing distance.

Now, if only one distance (principal viewing distance or refraction distance) is specified, it is assumed that the ordered addition relates to the given distance. Here, no adaptation of the addition takes place and the spectacle lens design or the spectacle lens is calculated and optimized for the ordered addition in the specified near distance. If no near distance (principal viewing direction and/or refraction distance) is specified, it is assumed that refraction has been performed in 40 cm and that this refraction distance corresponds to the principal viewing direction in near vision. Here, no adaptation of the addition takes place and the spectacle lens design or the spectacle lens is calculated and optimized for the ordered addition for 40 cm. Usually, the addition available from the manufacturers lie in a range between 0.75 D and 3.5 D. On the basis of the following simple calculation, the optician can check whether the spectacle lens is available:

$$IZ(dpt) = \text{Add}(dpt) - \left(\frac{1}{RDN(m)}\right) + \left(\frac{1}{MVDN(m)}\right),$$

where:
IZ is the individual addition power in D;
Add is the addition in D;
RDN is the amount of the refraction distance near in meters; and
MVDN is the amount of the principal viewing distance near.

Examples

Possible:
addition refraction=1.75D;
refraction distance near=40 cm;
principal viewing distance near=30 cm;

$IZ=1.75D-2.50D+3.33D=2.58D.$

Not possible:
addition refraction=2.00D;
refraction distance near=40 cm;
principal viewing distance near=20 cm;

$IZ=2.00D-2.50D+5.00D=4.50D$

In the calculation, it is assumed that no change of the amplitude of accommodation due to the change of the near distance occurs. However, this merely represents an approximation.

The graphical user interface 120 shown in FIG. 5 further comprises a section or input field "Base Curve" (section 135) into which the base curve fitting the selected frame best can be entered. In particular, it is possible to input a deviating base curve depending on the bending of the spectacles frame and to consider it in the optimization of the spectacle lens. The program automatically calculates the best-suitable bending or base curve for the respective refraction data and the respective base curve needs. The base curve calculated by the program may differ from the base curve input into the input field "Base Curve". Preferably, the input or ordered base curve is checked automatically as to that no plane and convex surface on the backside or rear surfaces curved to strongly arise, which may in particular cause too high an edge thickness.

FIG. 6 shows a mask or graphical user interface 140 for inputting individual data relating to the current, so far worn spectacles.

Information on the previous lenses can be entered into this mask, if known. For example, it can be selected from a list 142 ("lens type") whether the customer had single-vision, multifocal or progressive lenses or whether it is the first spectacle lens of the customer (no previous spectacle lenses). If progressive lenses were worn, further information on e.g. the material, the refractive power and/or the progression length may be made e.g. in a pop-up menu. Furthermore, the progression length of the previous spectacle lenses can be input automatically on the basis of the selected previous product, or manually. In particular, the progression length of the previous spectacle lenses may roughly be classified as e.g. a "standard" or long progression or as a short ("XS") progression length.

If the addition of the previous lenses is known, it can be entered into a dedicated input field 144 "Addition of the Previous Lenses". Thus, the addition of the previous lenses can be compared to the new addition. In the case of an addition increase of more than 0.5 D, a note field (e.g. as a pop-up window) may come up, which points out to the particularities of the addition increase.

FIG. 7 shows an example of a mask or graphical user interface 146 ("Design Profiler") for inputting data relating to the individual preferences and weighing of the viewing zones.

Five different pictographs for the distance, intermediate distance and near as well as the active behavior of the spectacle wearer each symbolize the zones the spectacle wearer should weigh up when choosing their design profile. The pictographs serve as examples of the respective distance zone and only represent a small selection of possible activities for that distance. With the points to be allocated, the zones can be weighted.

In a specific example, a total of 9 points can be allocated to the four different zones (distance, intermediate distance, near and active behavior). The more important the respective distance zone is to the customer and the more of their activities fall into a zone, the more points are allocated for this zone. The number of points per zone and the overall number can be restricted. For example, a maximum of 5 points may be allocated to one zone, but not more than 9 in total.

The allocated points determine the spectacle wearer's individual design profile. Expressed in simplified terms: The more points are allocated to the distance in relation to the given overall points, the lower is the individual distance reference point, and the more points are allocated to near in relation to the overall points, the higher is the individual near reference point. The points for the active behavior and the intermediate-distance vision mainly influence the length of the progression zone and thus also determine how distortion-free the spectacle lens is. An allocation of the same number of points to each zone corresponds to a balanced, universal design.

FIG. 8 shows the positions of the distance and near reference points of an individual spectacle lens design 148. The zones (150 and 152) in which the distance reference point (zone 150) and the near reference point (zone 152) can preferably be found have a gray background. The position of the centration and/or fitting point is marked by means of a cross 154 (centration cross). The distance reference point is in the middle of two round brackets 156. The near reference point is in the middle of the near measuring circle 158.

The vertical height of the distance reference point can preferably be determined flexibly, depending on the individual data of the spectacle wearer, in a range between +4 to −4 mm with respect to the centration and/or fitting point set for this spectacle lens by the manufacturer. The near distance point can preferably be determined flexibly between 13 and 20 mm vertically below the centration and/or fitting point. This results in a flexibly selectable progression length, which may preferably have a minimum of 13 mm and a maximum of 24 mm. Preferably, the distance and near reference points can be freely determined in steps of 0.1 mm within an admissible range. If e.g. the distance reference point is shifted to a vertical height of and/or −4 mm, the near reference point has to at least be at a vertical height of −17 mm. If the distance reference point is shifted to +4 mm, a minimum progression length of 17 mm results, since the near reference point preferably is not shifted to more than −13 mm.

The minimum vertical distance from the lower frame edge to the near reference point is preferably 2 mm. The distance reference point preferably has a minimum vertical distance of 6 mm, preferably of 8 mm from the upper frame edge. The maximally admissible progression length can be calculated with the help of the minimally admissible distances of the distance and near reference points from the upper and lower frame edge, respectively. The progression length is defined as the vertical distance between the distance reference point and the near reference point.

The effects achieved by shifting the design point in the progressive lens can be taken from the following table:

TABLE

| Individual vision needs of the spectacle wearer | Implementation during determination of the positions of the design points |
|---|---|
| Particularly large distance zone, e.g. driver | The design point "distance" should be shifted below the centration cross. The progression zone then only (clearly) begins below the centration cross. |
| Particularly large near zone, e.g. editor | The design point "near" should be shifted upward compared to the previous progressive lens. This allows for a relaxed near vision with a comfortable infraduction at the same time. |
| Particularly wide progression zone, e.g. architect | The design point "distance" should be shifted upward and the design point "near" downward. The longer the progression zone, the wider the progression corridor and the less rocking motion the customer notices. |

The positions of the distance and near reference points are preferably the same for the right and left spectacle lenses. However, in the case of different visual heights, the viewing zones of one of the eyes may be negatively affected. In order for the viewing zones of both eyes to be fully used, it is advantageous to select and determine the respective smaller vertical distance of the near reference point from the centration point.

FIG. 9 explains this relation. In FIG. 9:

$F1^{L,R}$ designates the vertical distance "centration point–upper frame edge" of the left (L) and the right (R) spectacle lens; and $F2^{L,R}$ designates the vertical distance "lower centration point–lower frame edge" of the left (L) and the right (R) spectacle lens.

In FIG. 9, the centration point and the distance reference point coincide. If the selection of the suitable vertical position of the near reference point is made on the basis of the lower frame edge, a vertical distance of the near reference point from the centration point of −18 mm would result for the right eye, and said distance would be −17 mm for the left eye. In this case, it is preferred to select and determine the smaller distance.

The data on the object distances "distance" and "near" in the refraction determination are taken into account in the calculation or optimization. Thus, the beam path corresponding to the actual situation of wear can be simulated more precisely and the imaging quality can consequently be improved.

In particular, it is possible to take the principal viewing distance in near vision in the actual position of wear of the spectacle lens into account when calculating the lens. FIG. 10a illustrates the principal viewing distance in near vision in the actual position of wear of the spectacle lens and FIG. 10b the refraction distance near or near distance in the refraction determination.

Generally, it is assumed that the addition has been determined in a near refraction distance of 40 cm (applies to additions up to 2.50 D, for higher additions, 1/addition holds true) and that it corresponds to a principal viewing distance in near vision of 40 cm. If the principal viewing distance in near vision deviates for the near refraction distance, the individual spectacle lens design can be optimized for this principal viewing direction.

When the optimum individual position of the distance and/or a near reference point is determined on the basis of individual data of the spectacle wearer, a corresponding spectacle lens design with the thus determined positions of the distance and near reference points, and optionally considering further individual parameters of the spectacle wearer, is automatically calculated.

As shown in FIG. 11, the design proposal can be visualized by means of a suitable graphical user interface 160A in order to represent the result (design recommendation). Depending on the selection in the settings, an additional graphical user interface 160B (design tuner) may be shown (cf. FIG. 12) with which, in addition to a result representation, the user is given the possibility to actively change the design by changing the individual position of the distance and/or a near reference point and/or by changing the individual data of the spectacle wearer (in particular the preferences, the frame data, etc.). In addition, the corresponding geometric data of the spectacle lens (center thickness, edge thickness, base curve, weight) can be calculated and be visualized as well by means of a suitable graphical user interface (preferably in the form of a three-dimensional module).

The graphical user interfaces 160A and 160B are divided into two areas: In the upper area 162, information on "Viewing" and/or "Performance" with the proposed individual spectacle lens design are illustrated; in the lower area 164, information on "Appearance" and "Geometry" of the individual spectacle lens or spectacles are illustrated.

In the area "Appearance" 164, in particular cosmetic properties and data regarding the aesthetics of the spectacle lens (e.g. weight, geometric data, such as fabrication height, maximum edge thickness, center thickness, base curve, etc.) of the edged spectacle lens(es) can be visualized and graphically illustrated. The visualization of the cosmetic properties of the spectacle lens may e.g. be achieved by means of a three-dimensional graphical representation of a model of the spectacle lens 166 with the determined geometric data, as is e.g. shown in FIGS. 11 and 12. The representation of the cosmetic properties of the spectacle lens may be influenced by selection of the base curve and the refractive index. The selection may depend on the effect.

Furthermore, the area "Appearance" 164 may comprise a sub-area 168 in which numerical values relating to the geometric properties of the spectacle lens, such as fabrication height, maximum edge thickness, center thickness, weight, base curve of the edged lens, etc. are shown. These values may be approximate values which optionally deviate from the actual lens geometry data. In addition to the engravings, individually determined distance and near reference points may be shown as marking points.

Views 169 of the edged spectacle lenses can be shown from different static perspectives (frame from above, frame from the front, from the side, from diagonally above) by means of suitable buttons. Moreover, the edged spectacle lenses can be made to rotate dynamically in the selected view by pressing an animation button. For a more detailed view, the image may be enlarged by means of a corresponding button.

Furthermore, the area "Appearance" 164 comprises a section 170 for displaying numerical values relating to the refractive index and a section for displaying the base curve (section 172). The displayed values for the base curve and the refractive index are composed of the effect range, the necessary diameter, the base curve wish, and the refraction data. Therefore, deviations from the base curve wish input into the mask "Ordered Values" are possible. The technically realizable values for the base curve and the refractive index of the lens can be changed via corresponding selection fields. If changes of the default base curve, the refractive index, etc. are made, the graphical illustration and the geometric data can be calculated again according to the changed values by pressing the button "Refresh".

In addition to the visualization of the cosmetic properties of the spectacle lens, a visualization of the optical properties of the spectacle lens takes place (viewing zones, in particular spatial location and size of the individual viewing zones). The representation of the sizes of the viewing zones can merely take place relative to the prescription data without taking a possible material dependence into account. Of course, consideration of a material dependence may be provided for. In addition to a visualization of the "Appearance", a visualization of the "Viewing" through the spectacle lens takes place as well. In particular, a visualization of the viewing comfort (e.g. infraduction, rocking, peripheral vision, distortions, etc.) may be provided for.

In addition, a suitable representation of performance values relating to the viewing zones, the viewing comfort and/or the cosmetic properties and the aesthetics of the individual spectacle lens may be provided for. Furthermore, performance values of alternative design proposals may be represented as well.

The area "Viewing" 162 of the graphical user interfaces 160A and 160B is therefore always divided into several sub-areas.

In the sub-area 174 "Binocular Viewing Zone Representation" of the area 162, the design ideal for the customer and the specified frame is schematically shown by means of an ellipsis. Gray areas are areas with aberrations (e.g. astigmatism in position of wear larger than 0.5 D). Moreover, the course of the 0.5-D isoastigmatism line may optionally be shown. The vertical heights of the distance and near reference points may each be characterized by (optionally differently colored) lines 175, 176. In the sub-area 177 of the area 162, numerical values for the spatial positions (in particular for the vertical height with respect to the centration point) of the distance and near reference points are shown.

In the sub-area 178 "Design Profile" of the area 162, a qualitative comparison of the sizes of the viewing zones with respect to each other is illustrated e.g. in the form of bars of different lengths, wherein F designates the distance zone, Z the intermediate zone, and N the near zone. The length of the respective bar or slide correlates with the respective setting of priorities associated to a corresponding distance zone. Since the length in the design profile results from the values of all previous masks, it may deviate from the preferences and weightings made by the customer before. Moreover, a qualitative assessment of the dynamic visual impression through the individual spectacle lens can be represented. The higher the bar representing the dynamic visual impression (bar "Dynamics"), the longer the progression zone length and the more the spectacle lens resembles a single-vision lens and the less rocking effect the spectacle lens has.

In addition, the optician and/or the spectacle wearer may be given the possibility to actively change the thus calculated spectacle lens. The change is e.g. made by actively altering the spatial position, in particular the vertical height of the distance and/or a near reference point. Alternatively, the weightings of the viewing zones can be changed.

The change or adaptation of the position of the distance and/or a near reference point and/or the preferences with respect to the viewing zones can e.g. be done by means of a graphical user interface. An example of a suitable graphical user interface in the form of a slide control 180 is shown in FIG. 12. By means of the slide control 180 shown in FIG. 12, a direct adaptation of the position of the distance and/or a near reference point is possible.

The new spectacle lens design with the changed position of the distance and/or a near reference point is preferably calculated and visualized in real time. Preferably, the difference or change of the optical properties of the new spectacle lens design with respect to the old one is visualized as well.

In addition to the possibilities described in the design recommendation (FIG. 11), an ellipse may e.g. be faded in the design tuner, which in the box dimensions and the specified centration corresponds to the approximate, binocular customer frame. Furthermore, the proposed, individual design can be changed here by e.g. sliding slide controls for the distance and near reference points upward or downward. In the ordered parameters in the display fields for the distance and near reference points, the numerical values for the positions of the reference points change correspondingly. Moreover, the lines for the distance and near reference points shift in the binocular viewing zone representation as well.

In addition to the gray viewing zones of the design recommendation, preferably colored (e.g. yellow) viewing zone lines (e.g. 0.5-D isoastigmatismline) may appear, which illustrate the altered, individual design. Also, in the sub-area design profile 178, the relation of the sizes of the viewing zones with respect to each other and the length of the bar "Dynamics" change as well. The allocated points in the section "Design Profiler" are preferably not influenced by the changes in the section "Design Tuner".

The following examples show individual progressive design with distance and near reference points determined individually depending on the obtained individual data of the spectacle wearer.

Example 1

Spectacle Wearer Architect

The spectacle wearer attaches great importance to a wide intermediate zone and wishes to have a rather "quiet spectacle lens" with little rocking motion, since most of the day he uses the intermediate zone (medium distance) for job-related reasons. With his current spectacles he wears a progressive lens with a progression zone length of 18 mm.

For this spectacle wearer, for the selected frame and corresponding centration, the program suggests setting the distance reference point at +2.4 mm above the centration and/or fitting point. Optimally, the near reference point would be at −19 mm below the centration and/or fitting point. With this progressive spectacle lens, the architect has a good compromise of a relaxed head posture, a wide intermediate zone, and little rocking motion for his viewing habits.

Example 2

Spectacle Wearer Editor

She attaches great importance to a large near zone and wishes to have to lower her view less than with her current spectacle lens, since most of the day she spends working in the near zone for job-related reasons. With her current spectacles he wears a progressive lens with a progression zone length of 18 mm. For this spectacle wearer, for the selected frame and corresponding centration, the program suggests setting the distance reference point at 1.5 mm above the centration and/or fitting point. Optimally, the near reference point would be at −15.5 mm below the centration and/or fitting point. Thus, the editor has a good compromise of a wide near zone and a relaxed head posture.

If the spectacle wearer attaches great importance to wide intermediate and near zones and little rocking motion in the spectacle lens, the program suggest shifting the distance reference point upward depending on the other input parameters. The distance reference point would then be above the centration and/or fitting point. Depending on the refraction data and the individual parameters, a "blurring" in the centration and/or fitting point of up to +0.25 D can arise. In addition to this slight blurring in the centration point, lateral restrictions in the distance zone can occur as well, since the spectacle wearer—when the distance reference point is shifted upward—looks in the zero direction of sight due to the progression in the spectacle lens beginning earlier. Due to the changed position of the progression zone in the spectacle lens, the viewing zones may be accordingly smaller at the level of the centration point, since the peripheral aberrations are shifted "upward". However, when selecting the position of the distance reference point, the spectacle wearer obtains a spectacle lens design or spectacle lens designed and optimized according to their individual viewing habits.

Example 3

Spectacle Wearer Works in the Field

The spectacle wearer attaches particular importance to a large distance zone, since most of the day he uses the distance zone for job-related reasons. With his current spectacles he wears a progressive lens with a progression zone length of 18 mm. For this spectacle wearer, for the selected frame and corresponding centration, the program automatically calculates and suggests setting the distance reference point at −2.5 mm below the centration and/or fitting point. Optimally, the near reference point would be at −18.4 mm below the centration and/or fitting point. With this progressive spectacle lens, the spectacle wearer has a large distance zone and a good compromise of little rocking motion and well usable intermediate and near zones.

Example 4

Following the question as for which activities and vision needs the spectacle wearer uses their spectacles, the following profile results for example:
    she drives a car regularly and watches TV;
    she plays an instrument and attends an orchestra rehearsal 2 times per week;
    in the evening, she likes reading the daily newspaper;
    she does sports at least 1 time per week, e.g. jogging or playing handball in a club.

In her current spectacles, she wears progressive lenses with a normal progression zone length. Since no preferences can be seen and the activities of this customer are equally distributed to the zones distance, medium distance and near, the same number of points is allocated to all distances and also to the activity behavior or dynamics. In other words, all viewing zones and the dynamic behavior or the dynamic characteristics are weighted equally. In the specific example, 2 points are allocated for all zones of the "Design Profiler" shown in FIG. 7. In the graphical user interface "Design Recommendation", the calculation result is displayed considering the individual inputs into the previous masks. The program automatically calculates and suggests positioning the distance reference point at 0 mm and the near reference point at −18 mm for this customer. This spectacle lens would correspond to a balanced, universal progressive spectacle lens having a progression zone length of 18 mm (e.g. a spectacle lens "Impression ILT®" by the company Rodenstock GmbH), since when choosing the design, it is assumed that there is no emphasis on any activity in one of the distance zones.

Example 5

Following the question as for which activities and vision needs the spectacle wearer uses their spectacles, the following profile results:
    he attaches particular importance to an undisturbed distance vision, since he spends most of the day in the car for job-related reasons;
    he only needs medium distance vision in order to clearly see the dashboard;
    near vision is only required for short writing activities, such as conclusions of contracts and the like;
    in this leisure time, he likes playing tennis and squash; little rocking motion in the spectacle lens is of particular importance to him.

In his current spectacles, he wears progressive lenses with a normal progression zone length (PZL). The spectacle wearer's preference is clearly the distance vision; the medium distance and the near play a subordinate role. Therefore, in this example, 4 points were allocated to the distance, and 1 point for medium distance and near each (cf. FIG. 7). Due to the requirements of the dynamic sports, such as freedom of distortion and good spatial perception, the activity behavior or dynamics was weighted with 3 points in the "Design Profiler" shown in FIG. 7. In the graphical user interface "Design Recommendation", the calculation result is displayed considering the individual inputs into the previous masks. The program automatically calculates and suggests positioning the distance reference point at −1.1 mm and the near reference point at −18.5 mm for this customer. Due to the position of the near reference point and the related relatively long progression zone length, the spectacle lens resembles a single-vision lens and is almost distortion-free. This influences the sporting activities of the spectacle wearer in a positive manner.

Example 6

Following the question as for which activities and vision needs the spectacle wearer uses their spectacles, the following profile results:
    distance vision plays a subordinate role, since he usually takes the spectacles off when driving a car;
    medium distance vision is of particular importance to him;
    the spectacle wearer is very sensitive to unusual distortion, e.g. in the case of curved lines in his graphical sketches;
    after work, he likes reading detective stories;
    due to his stressful job, he has no time for sports or other activities.

Thus, the most important distance for this spectacle wearer is the medium distance, near vision is important as well, distance vision and activity behavior play a subordinate role. Therefore, in the "Design Profiler" shown in FIG. 7, 1 point is allocated to the distance vision and the activity behavior each, 3 points for the medium distance and 2 points for the near vision. In the graphical user interface "Design Recommendation", the calculation result is displayed considering the individual inputs into the previous masks. The program automatically calculates and suggests positioning the distance reference point at +0.7 mm and the near reference point at −18.5 mm for this customer. Thus, the largest possible intermediate zone is realized. Due to the position of the near reference point and the related relatively long progression zone length, the spectacle lens resembles a single-vision lens and is almost distortion-free. This is of benefit to the spectacle wearer during his work with graphical sketches.

Example 7

Following the question as for which activities and vision needs the spectacle wearer uses their spectacles, the following profile results:
  she hardly uses the spectacles for distance vision activities, it therefore plays a subordinate role;
  reading documents is particularly important in her job;
  she attaches great importance to a comfortable infraduction for near vision tasks;
  due to the rather static posture at the workplace, rocking motions play a subordinate role;
  medium distance vision is necessary for occasional computer work.

The most important distance for this spectacle wearer is the near distance. The medium distance is important as well, distance vision and the activity behavior play a subordinate role. Therefore, in the "Design Profiler" shown in FIG. 7, 4 points are allocated to the near vision, 2 points for the medium distance and 1 point for the distance vision and the active behavior each. In the graphical user interface "Design Recommendation", the calculation result is displayed considering the individual inputs into the previous masks. The program automatically calculates and suggests positioning the distance reference point at +0.8 mm and the near reference point at −17.0 mm for this customer. Thus, the largest possible intermediate and near zones are realized for the customer's needs. Due to the position of the near reference point, the spectacle wearer's wish for a comfortable infraduction for near vision tasks is put into practice in her individual progressive lens.

With a button "Apply Active Selection", it can be determined which data are to be applied for the order. For example, the data for the area presently active (not in the background) are always applied. After the button "Apply Active Selection" has been pressed, an order form filled with the result can be printed out. The order form may be completed e.g. with further details, such as color, coating, ColorMatic color, measuring frame, etc. The individual data can also be stored and/or sent online to a spectacle lens manufacturer.

The individual data of the spectacle wearer can also be obtained by means of suitable order forms and be forwarded to the spectacle lens manufacturer. FIG. 13 shows an exemplary order form. In the order form are indicated the obtained individual refraction data (sphere, cylinder, axis, prism, base), frame and centration data, individual parameters of the spectacle wearer's eyes and the individual position of wear (pupillary distance, face form angle, forward inclination, corneal vertex distance, etc.), and optionally further individual data. With the help of the order form, it is possible to select the positions of the distance and/or a near reference point such that these correspond to the positions of a universal progressive lens design (e.g. Impression® or Impression XS® by the company Rodenstock GmbH). It is also possible to specify a medium progression zone length of 16 mm. Alternatively, the positions of the distance and/or a near reference point may be specified depending on the individual frame data (frame-optimized design). In this way, for example, the distance reference point can be specified on the centration point (i.e. at 0 mm) and the near reference point at 2 mm above the lower frame edge. Furthermore, the positions of the distance and near reference points can be determined individually considering further individual data (e.g. emphasis on activities and preferences regarding the viewing zones), as has been explained in detail above.

Subsequently, an individual spectacle lens is calculated and optimized, wherein the optimization takes place considering at least part of the obtained individual data, in particular data regarding the individual parameters of the spectacle wearer and the individual position of wear (face form angle, forward inclination, pupillary distance, corneal vertex distance, etc.).

In order to describe and/or calculate the imaging properties of spectacle lenses in the situation of wear, two calculation methods are known in geometrical optics:
  calculation with light rays (ray tracing); and
  calculation with wave fronts (wave tracing).

The term "ray tracing" is comprised of ray (German: Strahl) and tracing (German: Verfolgung). In geometrical optics, the ray tracing method is used to describe optical imaging. However, the calculation of a spectacle lens by means of ray tracing is very time-consuming, since for each point in the spectacle lens except for the actual light ray or main ray an "accompanying" bundle of neighboring rays through the spectacle lens has to be simulated as well.

Preferably, the individual spectacle lens is calculated by means of a wavefront tracing method, in particular by means of a local wavefront optimization. The term "wave tracing" is comprised of wave (German: Welle) and tracing (German: Verfolgung). Wavefronts can be used like light rays to describe or calculate optical imaging. A wavefront is the surface of same phase of a propagating wave. Each such wavefront combines all properties of a bundle of neighboring rays in a single object. Thereby, the calculation time can be reduced considerably, so that an individual optimization of each single spectacle lens is enabled. In particular, due to the free selection of the design points distance and/or near, it is possible to tailor the distribution of the imaging properties on the spectacle lens to the individual viewing habits of the spectacle wearer.

FIG. 14 shows a schematic illustration of the physiological and physical model of a spectacle lens in a specified position of wear, which it can be seen in FIG. 13 that the rays from an infinitely distant object 184 are all parallel, which is reflected in a plane wavefront 186. In contrast, the rays coming from a near object 188 diverge. The wavefront 190 is curved accordingly. The spectacle lens having a preferably spherical front surface 192 and an individually calculated, progressive atoric rear surface 194 now has to make sure that each wavefront 196, 198 is curved on the eye side such that the corresponding object 184, 188 is sharply defined on the retina of the eye 200. In an ideal case, these wavefronts must be curved on the eye side to the same extent for all directions of sight.

For the calculation of the spectacle lens, use is preferably made of a flexible surface design of the progressive surface to be calculated individually, having a plurality of evaluation points (preferably more than 7000 evaluation points), wherein each of these evaluation points is assigned its own local wavefront tracing. Preferably, the individual progressive surface is optimized by minimizing a target function evaluated at the evaluation points and by taking the physiological vision model into account. In this manner, it is possible to perform the optimization of a spectacle lens according to the variable target function by means of individual wavefront tracings very quickly and thus online after receipt of order.

The calculation of the spectacle lens preferably comprises an optimization with more than 2000 optimization parameters in a highly dimensional space. Multiprocessor mainframe computers can be used for the thus performed real-time online optimization.

Preferably, in the individual optimization of the spectacle lens, not only aberrations of low order (sphere, cylinder, prism), but also aberrations of higher order (e.g. coma and spherical aberration) are minimized. In this respect, reference is made to U.S. Pat. No. 7,063,421 B1. The fabrication of the individually calculated spectacle lens takes place e.g. by means of precision machines, preferably CNC grinding and polishing machines capable of realizing the calculated surface data with a precision in the μm range.

Preferably, in the optimization of the individual spectacle lenses, Listing's rule is particularly taken into account.

FIGS. 15a and 15b are schematic illustrations of the axis positions in a spectacle lens without taking Listing's rule into account (FIG. 15a) and with Listing's rule considered (FIG. 15b).

Since the eye performs a slight cycloduction during peripheral sight deviations, or eye excursions, there must not be a fixed cylinder axis throughout the entire spectacle lens, but it must change in the transition from the horizontal to the vertical (FIG. 15b). If the cylinder (known due to refraction) present in the eye is to be corrected well by the spectacle lens, the axis position of the cylinder in the spectacle lens must match well with the axis position the eye actually assumes because of its cycloduction. If the axis positions of the eye and the spectacle lens do not match, two obliquely crossed cylinders result. In the case of oblique, lateral sight deviations, the spectacle wearer would have an astigmatism that would not be corrected. This leads to a loss of vision in one zone. Preferably, the torsion adjustment is considered in the calculation of the individual spectacle lens. The consideration of Listing's rule becomes all the more relevant:

the higher the refraction cylinder of the customer is, and/or
the stronger the sight deviation deviates from the horizontal and vertical excursion, and/or
the stronger or larger the sight deviation is in total.

In a conventional progressive spectacle lens with a progressive front surface and a spherical/toric prescription surface, Listing's rule cannot be applied—in contrast to spectacle lenses with a progressive, individual, eye-side freeform surface.

Further preferably, in the optimization and calculation of the individual progressive spectacle lens, an individual predecentration is taken into account. Thus, the usable diameters are enlarged. The optimum predecentration can be calculated automatically on the basis of data relating to the frame and spectacle lens shape and data relating to the centration. Alternatively, an individual predecentration can be set by the optician himself. In this case, the desired diameter determined by means of a special centration card can be taken into account as well. In particular, a predecentration of up to 5 mm can be considered.

The individually calculated spectacle lens preferably has a spherical or rotationally symmetrical, aspherical, object-side front surface and an individual, progressive, eye-side freeform surface optimized depending on individually determined reference or design points distance and near, the individual refraction data, the individual parameters of the spectacle wearer and the situation of wear (e.g. pupillary distance, forward inclination, face form angle, corneal vertex distance, etc.).

The positions of the individual distance and near reference points are preferably marked by means of an individual stamping by means of non-permanent markings. Preferably, the positions of the individual distance and near reference points can be uniquely reconstructed by means of permanent markings or micro-engravings of the spectacle lens and a reconstruction rule (template, centration card).

FIGS. 16a, b show examples of non-permanent stampings of two individual progressive spectacle lenses.

The non-permanent marking or stamping of an individual spectacle lens optimized according to a preferred method of the invention consists of "movable" and "fixed" parts. The movable parts include two round brackets 202 marking the position of the distance reference point or the design point distance, and the near measuring circle 204 which marks the position of the near reference point or the design point "near". The distance reference point is located in the middle of the round brackets 202 and the near reference point in the middle of the near measuring circle 204. Depending on the positions of the distance and near reference points, the stamping of an individual spectacle lens may look differently thus. The position of the centration and/or fitting point is marked by means of a cross 206 (centration cross).

In a normal case, the prism reference point 208 is located 4 mm below the centration point. If the anisometropia is higher and the customer has a certain wish regarding a specific weighting (e.g. if the prismatic vertical differences are to be matched in the near zone), a prism matching point can be shifted in the desired direction.

In the example shown in FIG. 16a, the distance reference point is located at the level of the centration point. The near reference point is located at a vertical level of −18 mm below the centration point. FIG. 16b shows a further example of an individual stamping or an individual stamping image of an individual spectacle lens. The spectacle lens is individually calculated and optimized for a spectacle wearer attaching great importance to a large distance zone. The distance reference point is located at a vertical level of −4 mm below the centration and/or fitting point and the near reference point is located at a vertical level of −18 mm below the centration and/or fitting point.

Preferably, the values for the positions of the distance and near reference points (in particular for the vertical level with respect to the centration and/or fitting point) are also permanently engraved in the spectacle lens.

In exceptional cases, the stamping may differ from the above-described one. Furthermore, an explicit, non-permanent marking of the positions of the distance and near reference points and/or the centration and/or fitting point may be omitted. However, the reference points can be uniquely determined by means of a reconstruction rule comprising a centration card, stamped scales in steps of 1 mm, and a lens packet. In order to reconstruct the reference points, the spectacle frame is put onto the centration cross of the centration card with the marked centration point and the positions of the distance and near reference points are drawn onto the spectacle lens. The positions of the distance and near reference points may also be determined with the help of the permanently engraved values below the nasal base curve and index engravings.

In addition to a reconstruction of the positions of the reference points, it is possible to determine an optimum diameter of the raw-round spectacle lens by means of a corresponding centration card.

The determination of an optimum diameter by means of a centration card can be performed as follows:

1) Determining the corresponding minimum diameter for the selected frame, which—irrespective of the lateral centration—corresponds to the smallest circumscribing diameter circle of the centration card. This value corresponds to the first value in a diameter order, e.g. 50/60.

2) Positioning the visual point determined in the fitting process on the centration card such that it coincides with the centration cross of the centration card.
3) Reading the largest required diameter. In a decentration in the nasal direction, which is mostly the case (pupillary distance PD smaller than the center distance of the frame), this is the diameter circle which temporally circumscribes the frame. This value corresponds to the second value of the diameter order, e.g. 50/60. Preferably, the difference between the usable diameter and the minimum diameter is not more than 10 mm.
4) If the diameters are nasally and temporally equal, a centric version of the order is recommended.

In addition to the non-permanent markings or stampings, the individual spectacle lens also has permanent (micro-) engravings.

FIG. 17 shows the permanent engraving of an individually optimized, left spectacle lens viewed from behind (i.e. from the eye side). The functional engraving or permanent marking for the alignment of the spectacle lens is the infinite sign. The two functional engravings 210, 212 are located at a mutual distance of 34 mm at the level of the centration point or centration cross. Below the nasal infinite sign 212, the base curve engraving 214 and the index engraving 216 are located, both having two digits. Therebelow is the engraving 218 for the positions of the distance and near reference points. The first number indicates the vertical distance of the distance reference point relative to the centration and/or fitting point. The second number indicates the vertical distance of the near reference point relative to the centration and/or fitting point.

The distance reference point may preferably be in a range between −4 and +4 mm below or above the centration point. The near reference point may preferably be in a range between −13 and −20 mm below the centration and/or fitting point.

The two-digit addition engraving 220 is located temporally below the functional engraving 210.

In summary, in FIG. 17 designates:

| | |
|---|---|
| ∞ | functional engraving; |
| 25 | addition; |
| 65 | base curve; |
| 60 | refractive index; |
| −4 | individual vertical distance of the distance reference point from the centration and/or fitting point; |
| 18 | individual vertical distance of the near reference point from the centration and/or fitting point. |

The finished and stamped spectacle lens is packed into a lens packet and supplied to the optician/customer. An example of a lens packet is shown in FIG. 18. FIG. 19 shows a list of the pictograms and symbols used on the lens packet.

The individual data of the spectacle wearer are printed on each lens packet. More specifically, the following data are printed on each lens packet:
lens type, material, color, coating, diameter
ordered values: sphere, cylinder, axis, prism (resulting), base (resulting), addition;
target measured values for the focimeter in the measuring point for distance and addition in a concave vertex measuring position incl. the measurable prism in the prism reference point (composed of DRP and ordered prisms);
with prismatic refraction data: information on the type of refraction: PD centration (PMZ) or equation case (FF) and size and direction of the necessary centration correction;
general order data, additional information and commission on the back of the lens packet;
information on the individual parameters: monocular PD, CVD, FI, FFA;
information on the design points: positions of distance and near reference points with respect to the centration and/or fitting point;
base curve, predecentration and inset of the lens; indication of the corrected PD for fitting (COR PD) if the lens shape and the centration data are known.

The lens packet particularly contains the relevant data for a correct fitting in the spectacle frame, in particular data relating to the frame and lens shapes.

In particular, in an order where the lens shape and the centration data are indicated (such as with sports eyewear), the corrected pupillary distance PD is calculated for fitting (COR PD). This is necessary in order to obtain the right customer PD in the spectacles already provided with lenses. Also in the case of spectacle lenses with correction prism, the COR PD is to be used for fitting instead of the customer PD if the shape has been indicated. The necessary centration correction for prisms with horizontal and vertical base positions has already been taken into account in the calculation of the spectacle lenses. Thus, the value for the centration correction on the lens packet is always zero.

In an order without shape indication, the COR PD cannot be calculated, since the parameters (frame and centration data) required for the calculation thereof are not transmitted. In progressive spectacle lens with correction prisms optimized individually according to a preferred optimization method, the centration correction for prisms with horizontal and vertical base positions is preferably taken into account already when the lenses are calculated. The value for the centration correction on the lens packet remains zero. In an order where no shape is indicated, this value relates to the PD.

Figure 20B:
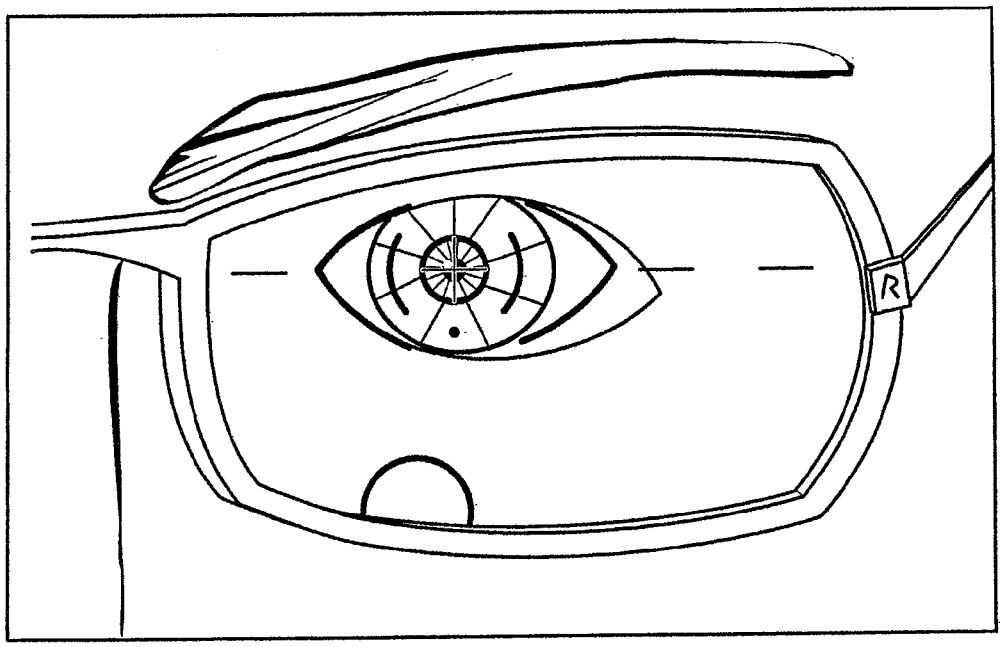

FIGS. 20a and 20b illustrate the centration of a progressive spectacle lens in front of the spectacle wearer's eyes and the corresponding position of the reference points. The spectacle lens shown in FIG. 20a is an individual spectacle lens with positions of the distance and near reference points individually determined according to a preferred method of the invention. In particular, the positions of the spectacle lens shown in FIG. 20a are specified individually depending on the frame data. The spectacle lens shown in FIG. 20b is a standard spectacle lens.

The individually calculated progressive spectacle lenses are adjusted according to reference point demands. This means, the centration and/or fitting point (or centration cross) is to be in the middle of the pupil in a habitual head and body posture in the zero direction of sight. The minimum fitting height depends on the position of the near reference point. Preferably, however, at least 2 mm remain below the near reference point in the frame. Thus, the minimum fitting height preferably is 15 mm below the centration point. If progressive lenses are adjusted differently from the centration recommendations, imaging properties may be restricted.

In the case of an erroneous centration of the spectacle lens, in particular if the centration is too low, this low centration leads to slight restrictions already in the distance zone. The differences particularly occur since the spectacle lens is not worn in the situation of wear underlying the optimization.

However, in contrast to the distance zone, considerable restrictions in a spectacle lens with lower centration can be found in the near zone. On the one hand, these restrictions result from the fact that the near zone is not present any more in the frame depending on the frame size and that the spectacle wearer looks through the progression zone in near vision, which progression zone is clearly narrower than the near zone. On the other hand, additional errors occur because the spectacle lens is not worn in the situation of wear underlying the optimization. Furthermore, with the same infraduction, the near power is not achieved and the customer has an additional accommodative effort.

An emphasis of the viewing zones can therefore correctly be created by shifting the distance and/or a near reference point, as has been described above. In addition, with a deviating principal direction of sight, e.g. in the case of particularly tall or small people, the principal viewing zones can be arranged individually such that they coincide with the respective principal direction of sight.

In the reference points, the so-called target measured values are measured as well, wherein the target measured values are indicated on the lens packet of the individual spectacle lens in addition to the ordered values. The target measured values preferably relate to the concave vertex measuring position. Tolerance considerations relate to the target measured values, not to the ordered values.

Distance Power

The target measured values for sphere, cylinder and axis are checked in the distance reference point. This distance reference point is located individually in a different manner, preferably within a range of +4 to −4 mm, about the centration point. The exact position of the distance reference point can be taken from the addition engraving below the base curve and index engravings. The measurement of the distance portion power is schematically illustrated in FIG. 21a.

Prismatic Power

In the prism reference point, a combined power of thickness reduction prism (base position always)270° and correction prisms is measured. The measurement of the prismatic power is schematically illustrated in FIG. 21b.

Near Power

The near reference point is located individually in a different manner within a range of −13 to −20 mm below the centration point. The exact position of the near reference point can be taken from the addition engraving below the base curve and index engravings.

The measurement of the near power is schematically illustrated in FIG. 21c.

Addition

The target measured value of the addition corresponds to the difference of the mean power (spherical equivalent) between the distance and near reference points. However, in many cases it is easier and generally sufficient to check the correspondence of ordered and engraved additions.

The flexible spectacle lens design produced according to the above-described method is particularly characterized by the following advantageous characteristics:
 optimum correction of visual defects by taking all refraction data (power optimization), the frame and centration data as well as PD, CVD, FI and FFA into account;
 viewing zones always have the optimum size and overlap ideally, since all individual parameters and refraction data are taken into account in the optimization;
 optimization
  in position of wear;
  for all refraction data;
   wavefront optimization with consideration of aberrations of higher order, such as coma and spherical aberration;
   consideration of Listing's rule;
   with Freiformtechnologie (free form technology)
 highest spontaneous compatibility;
 pinpoint-precise inset, can also be ordered deviating from 100% convergence (e.g. for one-eyed people);
 identical viewing zones on the right/left, also in the case of anisometropia;
 ordering of the refraction data for distance vision also in steps of 0.12 D;
 ordering of prisms/MDM incl.;
 perfect aesthetics.

Preferably, the spectacle lens design determined and calculated individually according to the customer's needs and parameters exhibits characteristic features of a balanced universal spectacle lens design, i.e. maximally large viewing zones for all distances with at the same time harmonic transitions between the central and peripheral viewing zones. Such a design or such a spectacle lens thus offers optimum vision comfort for a wide range of everyday situations (driving a car, leisure time, reading, etc.).

The invention claimed is:

1. A method for producing a spectacle lens with prismatic power for a spectacle wearer, comprising:
 obtaining individual user data of the spectacle wearer, wherein the individual user data comprises prismatic prescription data;
 designing the spectacle lens with prismatic power taking into account the individual user data; and
 determining centration data for the spectacle lens with prismatic power depending on the prismatic prescription data,
 wherein the individual user data comprises a corneal vertex distance e and/or an ocular center of rotation distance b' and/or an edge thickness $d_R$ of the spectacle lens and/or a center thickness and/or a lens forward inclination or frame forward inclination and/or a face form angle and/or a spectacle lens diameter or lens shape diameter and/or at least a refractive power and/or a refractive index of the spectacle lens and/or a base curve and/or an astigmatic power and/or an addition, and the centration data and in particular the centration shift $s_Z$ is determined depending on the corneal vertex distance e and/or the ocular center of rotation distance b' and/or the minimum lens thickness $d_{min}$ of the spectacle lens and/or the center thickness and/or the lens forward inclination or frame forward inclination and/or the face form angle and/or the spectacle lens diameter or lens shape diameter and/or the at least one refractive power and/or the refractive index of the spectacle lens and/or the base curve and/or the astigmatic power and/or the addition, and
 wherein the centration shift $s_Z$ in the unit mm is determined depending on the corneal vertex distance e in the unit mm and the prismatic power p in the unit cm/m according to $$s_z = \frac{(e+15)p}{10}$$

in the direction toward the base of the prism.

2. The method according to claim 1, further comprising applying a centration marking on the spectacle lens depending on the determined centration data.

3. The method according to claim 2, wherein applying the centration marking comprises stamping a centration cross on the at least one surface of the spectacle lens.

4. The method according to claim 1, wherein the individual user data comprises individual optical correction powers for correction of a visual defect of the spectacle wearer and data of wear relating to an individual positioning of the spectacle lens for the spectacle wearer and/or relating to an individual visual task of the spectacle wearer, and wherein the designing of the spectacle lens with prismatic power is performed taking into account the correction powers and/or the data of wear.

5. The method according to claim 1, wherein designing the spectacle lens with prismatic power comprises:
   determining a draft design taking into account the individual user data without the prismatic prescription data; and
   adding a prismatic power to the draft design depending on the prismatic prescription data.

6. The method according to claim 5, wherein adding the prismatic power takes place independently of further individual optical correction powers.

7. The method according to claim 5, wherein adding the prismatic power takes place by tilting a rear surface in the draft design of the spectacle lens relative to a front surface.

8. The method according to claim 5, wherein determining a draft design comprises determining draft centration data, in particular a draft centration point.

9. The method according to claim 8, wherein the draft centration point is determined such that upon the centration for the spectacle wearer according to the draft centration point, a draft spectacle lens fabricated according to the draft design fulfills the individual correction powers for the spectacle wearer, which are comprised by the user data.

10. The method according to claim 9, wherein determining the centration point comprises determining a centration shift $s_Z$ as a shift of the centration point relative to the draft centration point.

11. The method according to claim 10, wherein the centration shift $s_Z$ is determined depending on the prismatic prescription data and further individual user data.

12. A method for producing a prismatic spectacle lens for a spectacle wearer, in particular according to claim 1, comprising:
   obtaining individual user data of the spectacle wearer, wherein the individual user data comprises prismatic prescription data;
   determining a draft design taking into account the individual user data without the prismatic prescription data;
   determining a fitting point and at least one optical draft reference point for at least one optical power parameter of the spectacle lens depending on the individual user data without the prismatic prescription data such that upon the centration for the spectacle wearer according to the fitting point, a draft spectacle lens fabricated according to the draft design fulfills a predetermined value for the at least one optical power for the spectacle wearer for at least one main ray passing through the optical draft reference point;
   adding a prismatic power to the draft design depending on the prismatic prescription data; and
   determining a reference point shift $c_B$ depending on the prismatic prescription data.

13. The method according to claim 12,
   wherein the at least one optical draft reference point comprises a prism reference point, and wherein the predetermined value for the at least one optical power parameter comprises a value zero for the prismatic power; and/or
   wherein the at least one optical draft reference point comprises a distance reference point, and wherein the predetermined value for the at least one optical power parameter comprises a value for the dioptric distance power comprised by the individual user data; and/or
   wherein the at least one optical draft reference point comprises a near reference point, and wherein the predetermined value for the at least one optical power parameter comprises a value for the dioptric near power comprised by the individual user data.

14. The method according to claim 1, wherein the spectacle lens comprises
   a reference surface on or with respect to which the fitting point and/or the at least one optical reference point or draft reference point is specified and/or shifted,
   and a prescription surface determined and adjusted depending on the individual optical correction data.

15. The method according to claim 14, further comprising specifying a corrected prismatic draft design, comprising:
   shifting the prescription surface relative to the reference surface and/or the reference surface relative to the fitting point depending on the at least one reference point shift; and
   determining a corrected prismatic draft design by optimizing the prescription surface depending on the user data,
      wherein determining the at least one object-side actual direction as the direction of the object-side portion of the main ray through the at least one shifted draft reference point takes place on the basis of the corrected prismatic draft design.

16. The method according to claim 1, further comprising fabricating the spectacle lens with a centration marking, in particular a centration cross at the fitting point, and/or indicating or marking the centration point.

17. A machine-readable medium having stored thereon a computer program product comprising a program code which, when loaded and executed in a computer system, is adapted to perform a method according to claim 1.

18. A system for producing a prismatic spectacle lens, the system being configured to perform a method according to claim 1.

19. A method for producing a spectacle lens with prismatic power for a spectacle wearer, comprising:
   obtaining individual user data of the spectacle wearer, wherein the individual user data comprises prismatic prescription data;
   designing the spectacle lens with prismatic power taking into account the individual user data; and
   determining centration data for the spectacle lens with prismatic power depending on the prismatic prescription data,
      wherein the prismatic prescription data comprises a vertical component $p_y$ of a prismatic correction power, and a vertical component $c_y$ (in mm) of the decentration $c_Z$ and/or of the reference point shift $c_B$ is determined according to the formulas $$\delta = -\frac{p_y}{100} \ (p_y \text{ in cm/m})$$

$$\alpha_K = \frac{\delta}{n-1}$$

$$d_{Pr} = \frac{\varnothing|\tan\alpha_K|}{2} \approx \frac{\varnothing|\alpha_K|}{2},$$

with a spectacle lens diameter $\varnothing$ (in mm), $$z_K = b' + \frac{e+10}{100}(b' + d_{Pr} + d_{min} + \max(0, S'))\cos\alpha_v$$

with an ocular center of rotation distance b' (in mm), a corneal vertex distance e (in mm), a minimum thickness $d_{min}$ of the spectacle lens (in mm), a mean refractive power S' of the spectacle lens (in D), $\Delta y_1 = y_{BP} - y_{BZ}$, with a vertical position component $y_{BP}$ of the optical draft reference point (in mm) and a vertical position component $y_{BZ}$ of the fitting point, $$\varphi_1 = \arctan\left(\frac{\Delta y_1}{z_K}\right)$$

$$\varphi_2 = \varphi_1 + \delta$$

$$\Delta y_2 = z_K \tan\varphi_2$$

$$c_y = \Delta y_2 - \Delta y_1.$$

20. A method for producing a spectacle lens with prismatic power for a spectacle wearer, comprising:

obtaining individual user data of the spectacle wearer, wherein the individual user data comprises prismatic prescription data;

designing the spectacle lens with prismatic power taking into account the individual user data;

determining centration data for the spectacle lens with prismatic power depending on the prismatic prescription data; and determining at least one object-side target direction as the direction of the object-side portion of the main ray through the at least one optical draft reference point of the draft spectacle lens; and specifying a prismatic draft design by adding a prismatic power to the draft design depending on the prismatic prescription data, wherein determining a reference point shift comprises specifying at least one shifted draft reference point shifted by a starting value of the at least one reference point shift relative to the at least one draft reference point:

determining at least one object-side actual direction as the direction of the object-side portion of the main ray through the at least one shifted draft reference point on the basis of the prismatic draft design; and evaluating the prismatic draft design on the basis of the at least one target direction and the at least one actual direction, wherein in the case of an insufficient conformity of the at least one actual direction and the at least one target direction, a further reference point shift is determined in the step of evaluating the prismatic draft design, and in particular in the case of a sufficient conformity of the at least one actual direction and the at least one target direction, the prismatic draft design is specified as the spectacle lens design.

* * * * *